(12) United States Patent
Griffard

(10) Patent No.: US 8,998,246 B2
(45) Date of Patent: Apr. 7, 2015

(54) COLLAPSIBLE CART

(71) Applicant: John D. Griffard, Quincy, IL (US)

(72) Inventor: John D. Griffard, Quincy, IL (US)

(73) Assignee: Griffard & Associates, LLC, Quincy, IL (US)

( * ) Notice: Subject to any disclaimer, the term of this patent is extended or adjusted under 35 U.S.C. 154(b) by 0 days.

(21) Appl. No.: 13/933,580

(22) Filed: Jul. 2, 2013

(65) Prior Publication Data

US 2015/0008660 A1    Jan. 8, 2015

(51) Int. Cl.
    *B62B 3/02*    (2006.01)
(52) U.S. Cl.
    CPC .......................... *B62B 3/02* (2013.01)
(58) Field of Classification Search
    USPC .................... 280/47.34, 47.41, 651
    See application file for complete search history.

(56) References Cited

U.S. PATENT DOCUMENTS

| | | | | |
|---|---|---|---|---|
| 1,981,285 A | * | 11/1934 | Rechlicz | ........................ 248/421 |
| 2,574,563 A | * | 11/1951 | Hieb | .............................. 220/9.3 |
| 5,897,012 A | * | 4/1999 | Sortwell | ....................... 220/4.28 |
| 5,915,723 A | | 6/1999 | Austin | |
| 7,377,538 B2 | * | 5/2008 | Stuart et al. | .................... 280/651 |
| 7,731,221 B2 | | 6/2010 | Bess | |
| 7,992,598 B2 | * | 8/2011 | Elgan et al. | ...................... 141/10 |
| 8,042,819 B2 | | 10/2011 | Arnold et al. | |
| 8,100,280 B1 | * | 1/2012 | Hernandez | ...................... 220/9.4 |
| 8,388,015 B2 | | 3/2013 | Chen | |
| 2011/0006654 A1 | * | 1/2011 | Hassman et al. | .............. 312/400 |

FOREIGN PATENT DOCUMENTS

EP    2397048    12/2011

* cited by examiner

*Primary Examiner* — Hau Phan
*Assistant Examiner* — Bryan Evans
(74) *Attorney, Agent, or Firm* — Bryan Cave LLP

(57) ABSTRACT

The present invention relates to a collapsible cart which has a substantially rectangular base comprising four side regions, four corner regions and hinge assemblies disposed at each corner region, hinged upright frame assemblies having a lower end rotatably connected to the hinge assemblies at the base, and an open top frame having hinge assemblies at each corner region rotatably connected to an upper end of the hinged upright frame assemblies. The base, upright and top frame hinge assemblies are all oriented so the upright frame assemblies can fold along the side regions of the cart when the collapsible cart is folded flat. In one particular embodiment, the base and top frame are square. A basket for storing a variety of items may be attached to the collapsible cart. The collapsible cart may also have wheels or casters on the base to permit easy movement of the collapsible cart.

7 Claims, 11 Drawing Sheets

COLLAPSIBLE CART

FIELD OF THE INVENTION

This invention relates generally to storage carts and, more particularly, to storage carts which may fold and collapse for ease of storage and transportation.

BACKGROUND OF THE INVENTION

Embodiments of the present invention are directed to providing an improved collapsible cart for the storage and organization of items. The collapsible cart, when in an upright or open position and while being used is sturdy and stable and when in a collapsed or folded position is reduced is size such that it can be easily stored or transported.

SUMMARY OF THE INVENTION

The present invention discloses a collapsible cart which has a substantially rectangular base comprising four side regions and four corner regions and hinge assemblies disposed at each corner region, hinged upright frame assemblies having a lower end rotatably connected to the hinge assemblies at the base, and an open top frame having hinge assemblies at each corner region rotatably connected to an upper end of the hinged upright frame assemblies. The hinges in the base, the upright frame assemblies and the top frame are all oriented such that the collapsible cart can fold flat wherein the upright frame assemblies fold over the side regions of the cart. In one particular embodiment, the base and top frame are square. Preferably, the collapsible cart has wheels or casters on the base to permit easy movement of the collapsible cart. In certain embodiments, the wheels or casters may be lockable.

The present invention also discloses a basket attached to the collapsible cart such that a variety of items can be stored and organized in the collapsible cart (e.g., pool items, sports equipment, clothing, etc.). In other embodiments of the present invention, the base and top frame of the collapsible cart can be rectangular and a storage envelope can be attached to the collapsible cart and a rectangular table top can be affixed to the top frame. The storage envelope comprises an internal compartment having one or more shelves affixed to the envelope. The internal compartment may be accessible via one or more panels which can be opened. Accordingly, this embodiment of the collapsible cart can be used as a portable bar cart or portable table wherein food, drinks, cups, plates, utensils, etc. can be stored in the storage envelope or placed on top of the table top. Such collapsible bar cart could be used for tailgating at a sporting event, at a pool or beach, or at a variety of other outdoor or indoor activities.

Other embodiments of the collapsible cart may include larger wheels including, but not limited to, pneumatic tires, solid rubber tires, foam rubber tires, hard plastic tires, etc. that enable the collapsible cart to be rolled over rough terrain and may include a pull handle attached to the base frame. Accordingly, collapsible cart could be used as a collapsible wagon. The pull handle and/or tires may be detachable and or foldable in order to maintain ease of storage of the collapsible cart.

Briefly, therefore, one embodiment of the present invention is directed to a base comprising a plurality of side regions, a plurality of corner regions and a plurality of hinges, wherein one hinge is disposed at each corner; an open top frame comprising a plurality of side regions equal to the plurality of side regions of the base, a plurality of corner regions equal to the plurality of corner regions of the base and a plurality of hinges equal to the plurality of corner regions of the base, wherein one hinge is disposed at each corner; and a plurality of hinged upright frame assemblies equal to the plurality of corner regions of the base and top frame; wherein the plurality of upright hinged frame assemblies are rotatably connected to the plurality of base hinges and the plurality of open top frame hinges, and wherein the plurality of base hinges, the plurality of open top frame hinges and the plurality of hinged upright frame assemblies are oriented to permit folding of the collapsible cart wherein one hinged upright frame assembly folds over each side region of the base.

Another aspect of the present invention is directed to a collapsible cart, comprising a base comprising a first side region, a second side region, a third side region, and a fourth side region, and a first corner region, a second corner region, a third corner region and a forth corner region, and wherein a first base hinge assembly is disposed at the first corner region, a second base hinge assembly is disposed at the second corner region, a third base hinge assembly is disposed at the third corner region and a fourth base hinge assembly is disposed at the fourth corner region. The first base hinge assembly has a first base hinge axis, such that the first base hinge axis is horizontally disposed, the second base hinge assembly has a second base hinge axis, such that the second base hinge axis is horizontally disposed and substantially orthogonal to the first base hinge axis, the third base hinge assembly has a third base hinge axis, such that the third base hinge axis is horizontally disposed and substantially orthogonal to the second base hinge axis, and the fourth base hinge assembly has a fourth base hinge axis, such that the forth base hinge axis is horizontally disposed and substantially orthogonal to the third base hinge axis. Furthermore, a first upright frame assembly may be rotatably connected to the first base hinge assembly, a second upright frame assembly may be rotatably connected to the second base hinge assembly, a third upright frame assembly may be rotatably connected to the third base hinge assembly, and a fourth upright frame assembly may be rotatably connected to the fourth base hinge assembly. The first upright frame assembly comprises a lower upright frame member, an upper upright frame member and a first upright hinge assembly disposed there between, the second upright frame assembly comprises a lower upright frame member, an upper upright frame member and a second upright hinge assembly disposed there between, the third upright frame assembly comprises a lower upright frame member, an upper upright frame member and a third upright hinge assembly disposed there between, and the fourth upright frame assembly comprises a lower upright frame member, an upper upright frame member and a fourth upright hinge assembly disposed there between. The first upright hinge assembly has a first upright hinge axis, such that the first upright hinge axis is horizontally disposed and parallel to the first base hinge axis, the second upright hinge assembly has a second upright hinge axis, such that the second upright hinge axis is horizontally disposed and parallel to the second base hinge axis, the third upright hinge assembly has a third upright hinge axis, such that the third upright hinge axis is horizontally disposed and parallel to the third base hinge axis, and the fourth upright hinge assembly has a fourth upright hinge axis, such that the forth upright hinge axis is horizontally disposed and parallel to the fourth base hinge axis. The collapsible cart further comprises a top frame comprising a first side region, a second side region, a third side region, and a fourth side region, and a first corner region, a second corner region, a third corner region and a forth corner region, wherein a first top hinge is disposed at the first corner region and rotatably connected with the first upright frame assembly, a second top hinge assembly is disposed at the second corner region and rotatably connected with the second upright frame assembly, a third top hinge assembly is disposed at the third corner region and rotatably connected with the third upright frame assembly, and a fourth top hinge assembly is disposed at the fourth corner region and rotatably connected with the fourth upright frame assembly. The first top hinge assembly has a first top hinge axis, such that the first top hinge axis is horizontally disposed and parallel to the first base hinge axis, the second top hinge assembly has a second top hinge axis, such that the second top hinge axis is horizontally disposed and parallel to the second base hinge axis, the third top hinge assembly has a third top hinge axis, such that the third top hinge axis is horizontally disposed and parallel to the third base hinge axis, and the fourth top hinge assembly has a fourth top hinge axis, such that the forth top hinge axis is horizontally disposed and parallel to the fourth base hinge axis. The above orientations of the first, second, third and fourth base hinge assemblies, first, second, third and fourth upright hinge assemblies, and the first, second, third and fourth top hinge assemblies permit folding of the collapsible cart wherein the first upright frame assembly folds over the first side region of the base, the second upright frame assembly folds over the second side region of the base, the third upright frame assembly folds over the third side region of the base, and the fourth upright frame assembly folds over the fourth side region of the base.

BRIEF DESCRIPTION OF THE FIGURES

These and other features, aspects and advantages of the invention will become more fully apparent from the following detailed description, appended claims, and accompanying drawings, wherein the drawings illustrate features in accordance with exemplary embodiments of the present invention, and wherein:

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. As used herein, the term "disposed" means arranged at or near.

Figure 1:
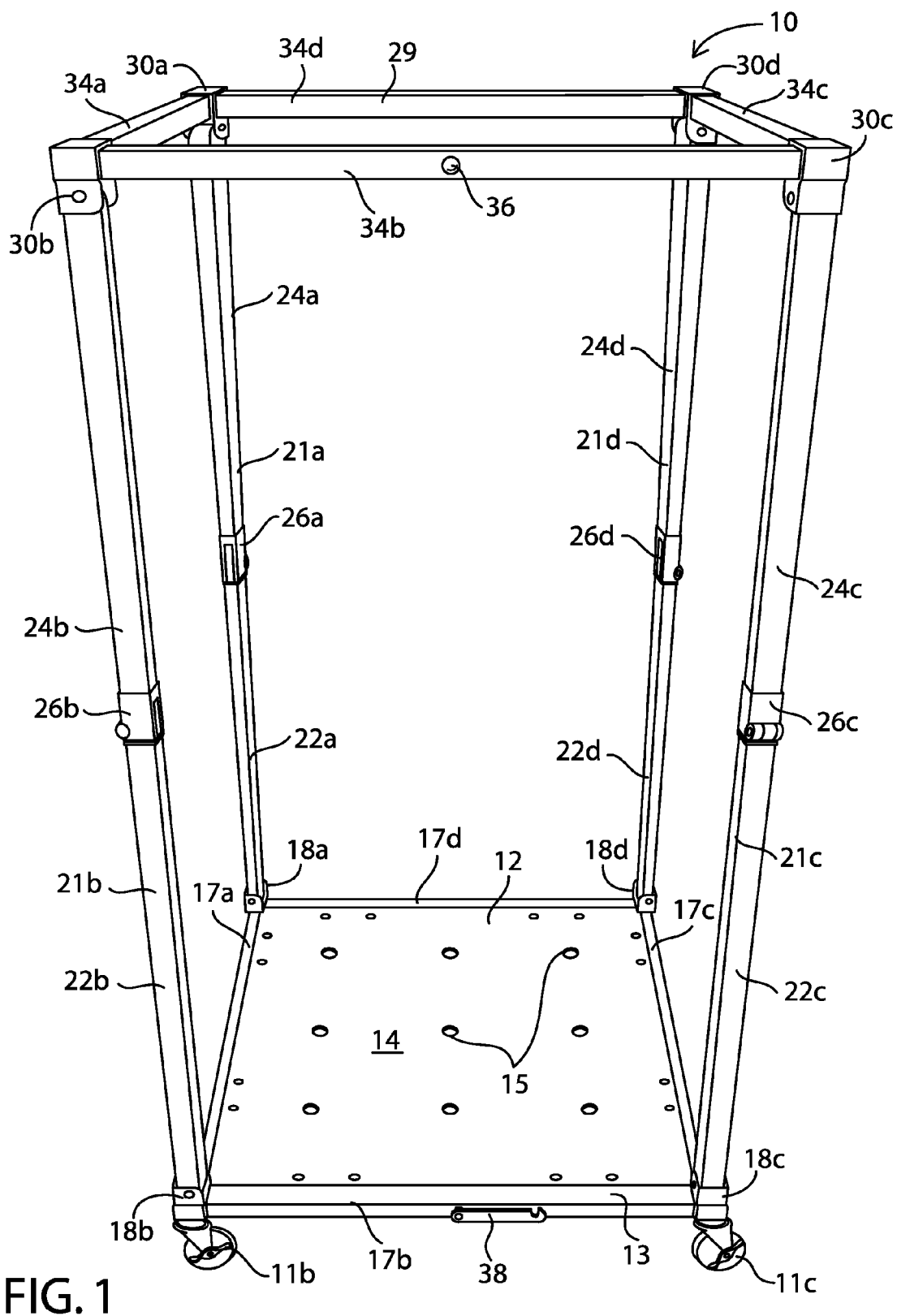
FIG. 1 is a front view of the collapsible storage cart in the upright position according to one embodiment of the present invention.
Figure 2:
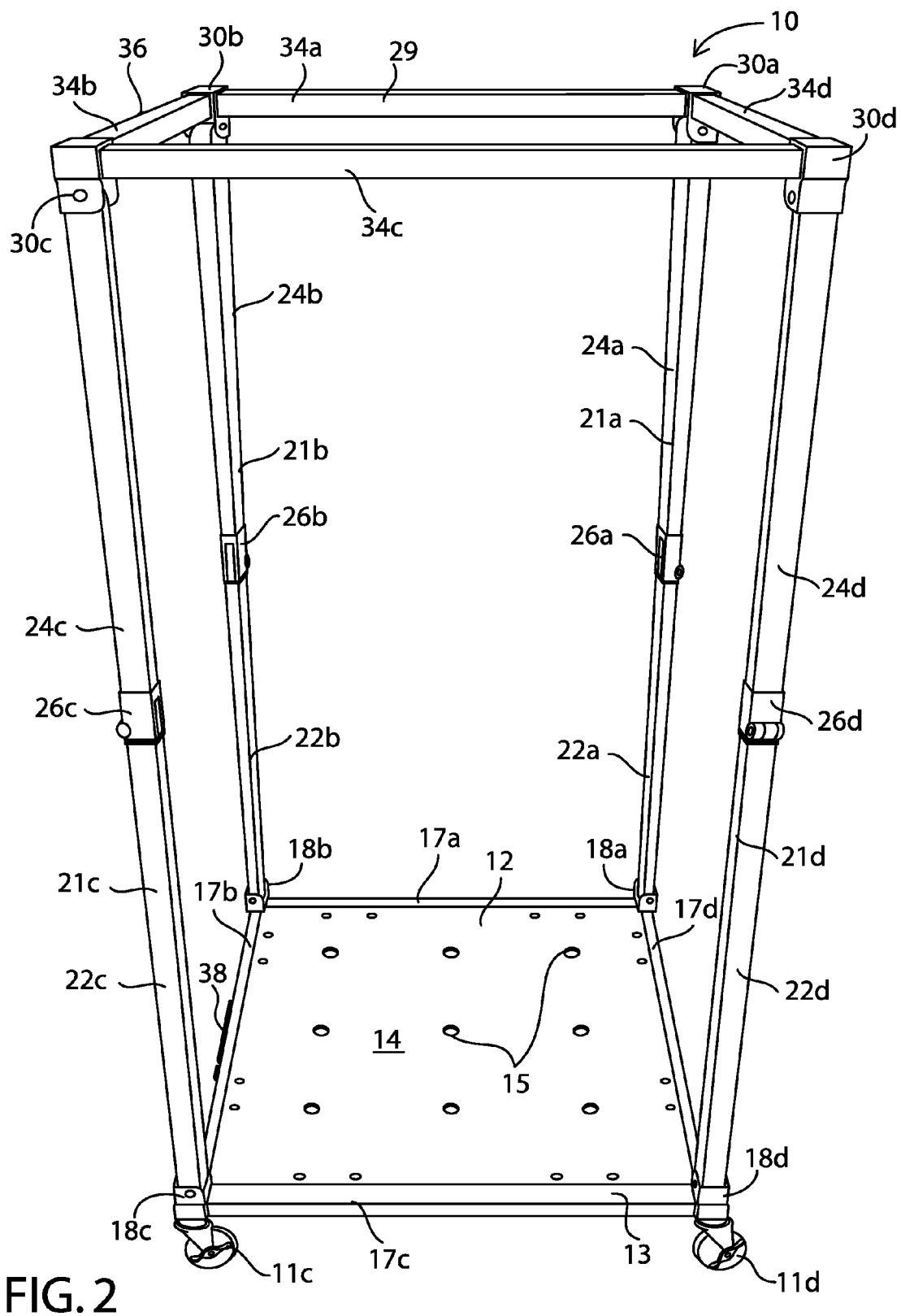
FIG. 2 is a right view of the collapsible storage cart in the upright position according to one embodiment of the present invention.
Figure 3:
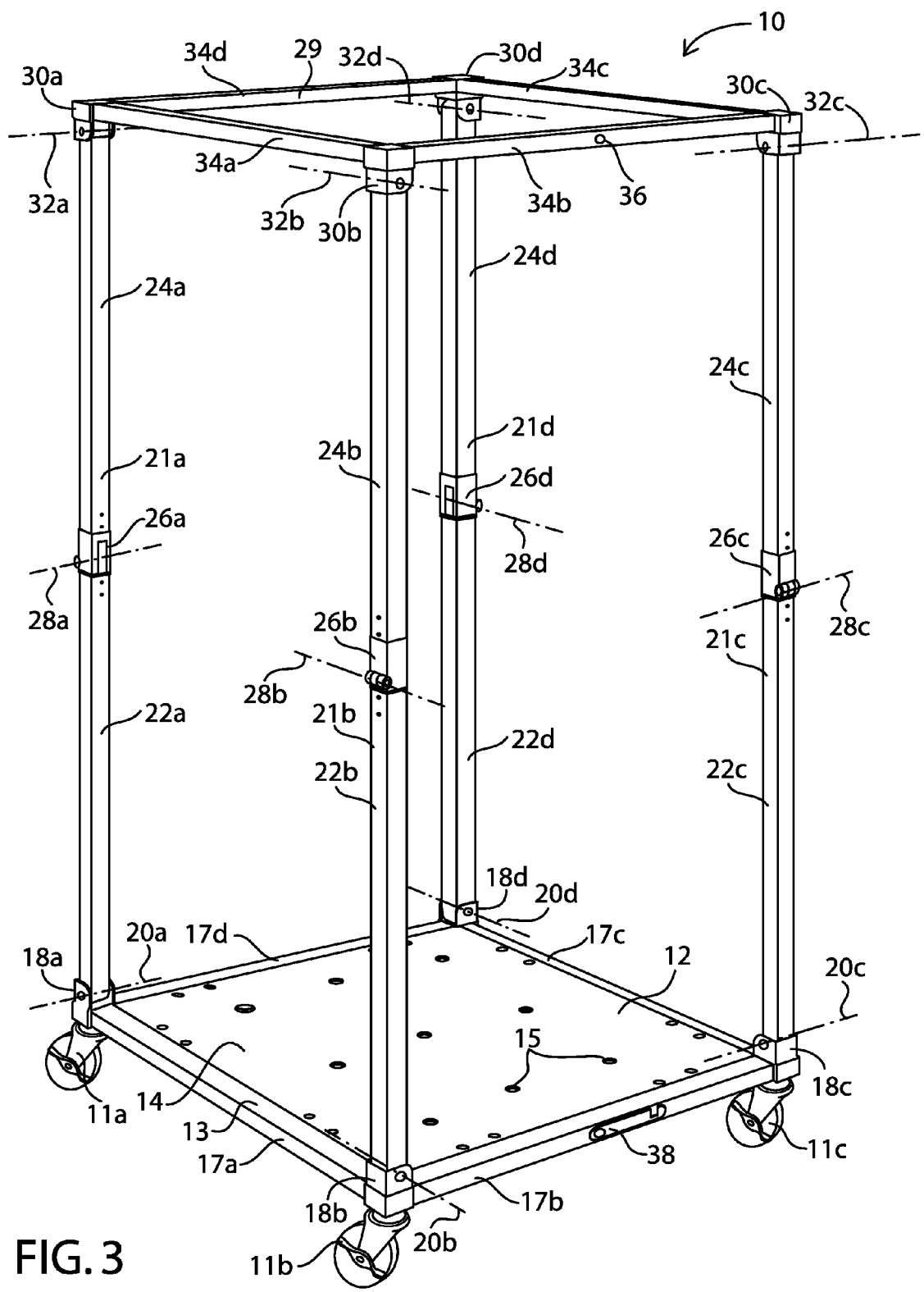
FIG. 3 is a perspective view of the collapsible storage cart in the upright position according to one embodiment of the present invention.

FIGS. 1, 2 and 3 illustrate certain principal components of one embodiment of the collapsible cart of the present invention. In this particular embodiment, the collapsible cart 10 comprises a substantially rectangular base 12 comprising a base plate 14 and a base frame 13 that may comprise four horizontal base rails (17a, 17b, 17c, 17d) such that base 12 has four side regions and four corners. In this particular embodiment, substantially rectangular base 12 is square although other shapes are contemplated including, but not limited to, triangular, pentagonal, hexagonal, octagonal, circular, elliptical, etc. The four horizontal base rails (17a, 17b, 17c, 17d) may form the side regions of substantially rectangular base frame 13. Connected to the four horizontal base rails (17a, 17b, 17c, 17d) are four base hinge assemblies (18a, 18b, 18c, 18d). The four base hinge assemblies (18a, 18b, 18c, 18d) are disposed at the corner regions of substantially rectangular base 12. In this particular embodiment, a first base hinge assembly 18a is connected to a second end of a first horizontal base rail 17a and to a first end of a second horizontal base rail 17b, a second base hinge assembly 18b is connected to a second end of the second horizontal base rail 17b and to a first end of a third horizontal base rail 17c, a third base hinge assembly 18c is connected to a second end of the third horizontal base rail 17c and to a first end of a fourth horizontal base rail 17d, and a fourth base hinge assembly 18d is connected to a second end of the fourth horizontal base rail 17d and to a first end of the first horizontal base rail 17a. Each base hinge assembly (18a, 18b, 18c, 18d) has a corresponding base hinge axis (20a, 20b, 20c, 20d) which permits rotation about the axis. First base hinge axis 20a is horizontally disposed such that it is parallel to base 12. Second base hinge axis 20b is horizontally disposed such that it is parallel to base 12 and is substantially orthogonal to first base hinge axis 20a. Third base hinge axis 20c is horizontally disposed such that it is parallel to base 12 and is substantially orthogonal to second base hinge axis 20b. Fourth base hinge axis 20d is horizontally disposed such that it is parallel to base 12 and is substantially orthogonal to third base hinge axis 20b and substantially orthogonal to first base hinge axis 20a. Therefore, first base hinge axis 20a and third base hinge axis 20c are parallel and second base hinge axis 20b and fourth base hinge axis 20d are parallel. Accordingly, first base hinge axis 20a and third base hinge axis 20c are substantially orthogonal to second base hinge axis 20c and fourth base hinge axis 20d.

As illustrated in FIGS. 1, 2, 3, 5 and 7, in one embodiment, collapsible cart 10 further comprises a substantially rectangular top frame 29 comprising four side regions and four corners. Substantially rectangular top frame 29 may comprise four horizontal top rails (34a, 34b, 34c, 34d) wherein the four horizontal top rails (34a, 34b, 34c, 34d) may form the side regions of substantially rectangular top frame 29. In this particular embodiment, substantially rectangular top frame 29 is square although other shapes are contemplated including, but not limited to, triangular, pentagonal, hexagonal, octagonal, circular, elliptical, etc. Connected to the four horizontal top rails (34a, 34b, 34c, 34d) are four top hinge assemblies (30a, 30b, 30c, 30d). The four top hinge assemblies (30a, 30b, 30c, 30d) are disposed at the corner regions of substantially rectangular top frame 29. In this particular embodiment, a first top hinge assembly 30a is connected to a second end of a first horizontal top rail 34a and to a first end of a second horizontal top rail 34b, a second top hinge assembly 30b is connected to a second end of the second horizontal top rail 34b and to a first end of a third horizontal top rail 34c, a third top hinge assembly 30c is connected to a second end of the third horizontal top rail 34c and to a first end of a fourth horizontal top rail 34d, and a fourth top hinge assembly 30d is connected to a second end of the fourth horizontal top rail 34d and to a first end of the first horizontal top rail 34a. Each top hinge assembly (30a, 30b, 30c, 30d) has a corresponding base hinge axis (32a, 32b, 32c, 32d) which permits rotation about the axis. First top hinge axis 32a is horizontally disposed such that it is parallel to base 12 and parallel to first base hinge axis 20a. Second top hinge axis 32b is horizontally disposed such that it is parallel to base 12 and parallel to second base hinge axis 20b. Third top hinge axis 32c is horizontally disposed such that it is parallel to base 12 and parallel to third base hinge axis 20c. Fourth top hinge axis 32d is horizontally disposed such that it is parallel to base 12 and parallel to fourth base hinge axis 20d. Therefore, first top hinge axis 32a and third top hinge axis 32c are parallel and second top hinge axis 32b and fourth top hinge axis 32d are parallel. Accordingly, first top hinge axis 32a and third top hinge axis 32c are substantially orthogonal to second top hinge axis 32b and fourth top hinge axis 32d.

In certain embodiments, as further illustrated in FIGS. 1, 2, 3 and 5, collapsible cart 10 further comprises four upright frame assemblies (21a, 21b, 21c, 21d) disposed between base 12 and top frame 29. Each of the upright frame assemblies (21a, 21b, 21c, 21d) comprise lower upright frame members (22a, 22b, 22c, 22d), upper upright frame members (24a, 24b, 24c, 24d), and upright hinge assemblies disposed therebetween (26a, 26b, 26c, 26d). In certain embodiments, for example, lower upright frame members (22a, 22b, 22c, 22d) and upper upright frame members (24a, 24b, 24c, 24d) may be nearly equal in length. In other embodiments, for example, lower upright frame members (22a, 22b, 22c, 22d) may be longer than upper upright frame members (24a, 24b, 24c, 24d). In yet other embodiments, for example, lower upright frame members (22a, 22b, 22c, 22d) may be shorter than upper upright frame members (24a, 24b, 24c, 24d). The bottom end of each lower upright frame member (22a, 22b, 22c, 22d) may be connected to each base hinge assembly (18a, 18b, 18c, 18d) such that first lower upright frame member 22a is connected to first base hinge assembly 18a, second lower upright frame member 22b is connected to second base hinge assembly 18b, third lower upright frame member 22c is attached to third base hinge assembly 18c, and forth lower upright frame member 22d is attached to fourth base hinge assembly 18d. The top end of each upper upright frame member (24a, 24b, 24c, 24d) is attached to each top hinge assembly (30a, 30b, 30c, 30d) such that first upper upright frame member 24a is attached to first top hinge assembly 30a, second upper upright frame member 24b is attached to second top hinge assembly 30b, third upright frame member 24c is attached to third top hinge assembly 30c, and forth upright frame member 24d is attached to fourth top hinge assembly 30d.

In one embodiment, each upright hinge assembly (26a, 26b, 26c, 26d) has a corresponding upright hinge axis (28a, 28b, 28c, 28d) which permits rotation about the axis. First upright hinge axis 28a is horizontally disposed such that it is parallel to base 12 and parallel to first base hinge axis 20a. Second upright hinge axis 28b is horizontally disposed such that it is parallel to base 12 and parallel to second base hinge axis 20b. Third upright hinge axis 28c is horizontally disposed such that it is parallel to base 12 and parallel to third base hinge axis 20c. Fourth upright hinge axis 28d is horizontally disposed such that it is parallel to base 12 and parallel to fourth base hinge axis 20d. Therefore, first upright hinge axis 28a and third upright hinge axis 28c are parallel and second upright hinge axis 28b and fourth upright hinge axis 28d are parallel. Accordingly, first upright hinge axis 28a and third upright hinge axis 28c are substantially orthogonal to second upright hinge axis 28b and fourth upright hinge axis 28d.

The aforementioned orientations of base hinge assemblies (18a, 18b, 18c, 18d), upright hinge assemblies (26a, 26b, 26c, 26d) and top hinge assemblies (30a, 30b, 30c, 30d) permit collapsible cart 10 to be used in an upright, or open, position when used and to be folded into a collapsed position for storage of collapsible cart 10 when not in use. In certain embodiments, for example, base hinge assemblies (18a, 18b, 18c, 18d) and top hinge assemblies (30a, 30b, 30c, 30d) may each permit about 70 degrees of rotation about base hinge axes (20a, 20b, 20c, 20d) and top hinge axes (32a, 32b, 32c, 32d), respectively. In other embodiments, for example, base hinge assemblies (18a, 18b, 18c, 18d) and top hinge assemblies (30a, 30b, 30c, 30d) may each permit about 80 degrees of rotation about base hinge axes (20a, 20b, 20c, 20d) and top hinge axes (32a, 32b, 32c, 32d), respectively. In yet other embodiments, for example, base hinge assemblies (18a, 18b, 18c, 18d) and top hinge assemblies (30a, 30b, 30c, 30d) may each permit about 90 degrees of rotation about base hinge axes (20a, 20b, 20c, 20d) and top hinge axes (32a, 32b, 32c, 32d), respectively. In yet other embodiments, for example, base hinge assemblies (18a, 18b, 18c, 18d) and top hinge assemblies (30a, 30b, 30c, 30d) may each permit about 100 degrees of rotation about base hinge axes (20a, 20b, 20c, 20d) and top hinge axes (32a, 32b, 32c, 32d), respectively. In other embodiments, for example, base hinge assemblies (18a, 18b, 18c, 18d) and top hinge assemblies (30a, 30b, 30c, 30d) may each permit about 110 degrees of rotation about base hinge axes (20a, 20b, 20c, 20d) and top hinge axes (32a, 32b, 32c, 32d), respectively. Accordingly, in certain embodiments, base hinge assemblies (18a, 18b, 18c, 18d) and top hinge assemblies (30a, 30b, 30c, 30d) may each permit from about 70 degrees to about 110 degrees of rotation about base hinge axes (20a, 20b, 20c, 20d) and top hinge axes (32a, 32b, 32c, 32d), respectively. In certain embodiments, for example, upright hinge assemblies (26a, 26b, 26c, 26d) may permit about 160 degrees of rotation about upright hinge axes (28a, 28b, 28c, 28d). In other embodiments, for example, upright hinge assemblies (26a, 26b, 26c, 26d) may permit about 170 degrees of rotation about upright hinge axes (28a, 28b, 28c, 28d). In other embodiments, for example, upright hinge assemblies (26a, 26b, 26c, 26d) may permit about 180 degrees of rotation about upright hinge axes (28a, 28b, 28c, 28d). In yet other embodiments, for example, upright hinge assemblies (26a, 26b, 26c, 26d) may permit about 190 degrees of rotation about upright hinge axes (28a, 28b, 28c, 28d). In yet other embodiments, for example, upright hinge assemblies (26a, 26b, 26c, 26d) may permit about 200 degrees of rotation about upright hinge axes (28a, 28b, 28c, 28d). Accordingly, in certain embodiments, upright hinge assemblies (26a, 26b, 26c, 26d) may each permit from about 160 degrees to about 200 degrees of rotation about upright hinge axes (28a, 28b, 28c, 28d).

Figure 5:
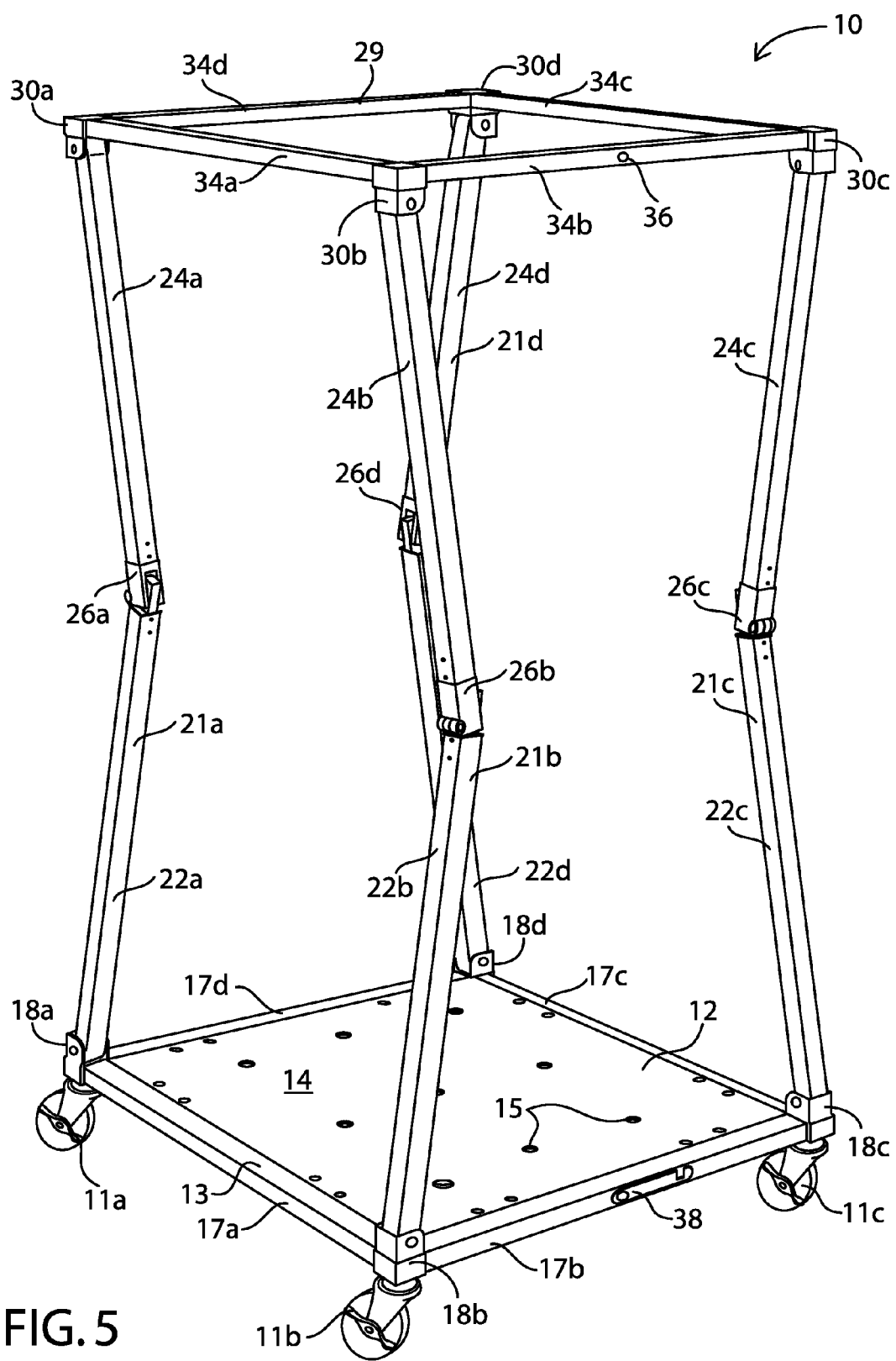
FIG. 5 is a perspective view of the collapsible storage cart partially collapsed according to one embodiment of the present invention.
Figure 7:
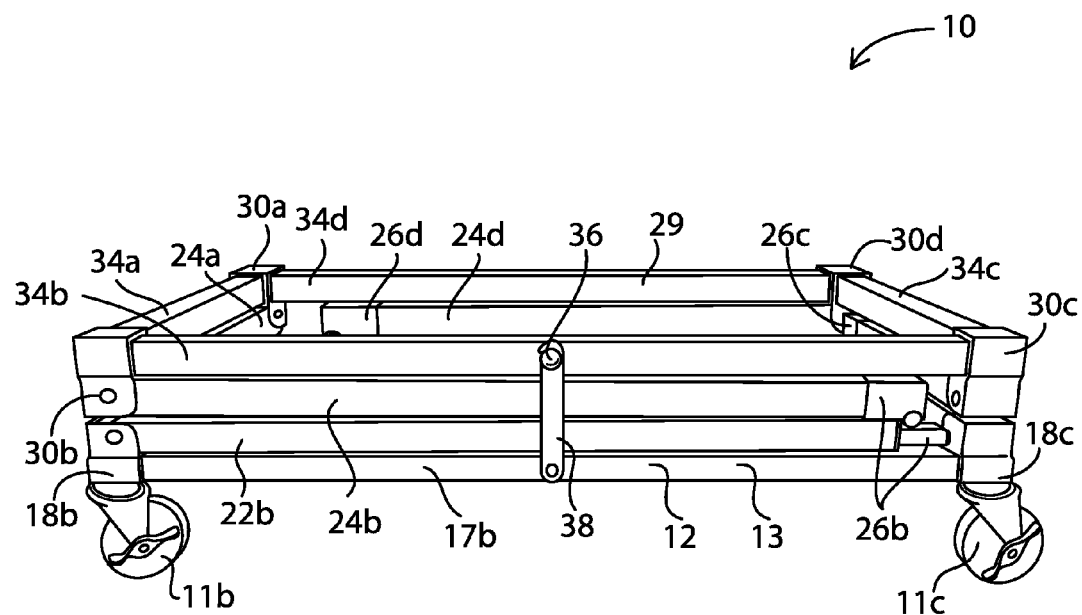
FIG. 7 is a front view of the collapsible storage cart completely collapsed according to one embodiment of the present invention.

When collapsible cart 10 is in its upright position, lower upright frame members (22a, 22b, 22c, 22d) and upper upright frame members (24a, 24b, 24c, 24d) may be aligned to form a column such that the bottom end of lower upright frame members (22a, 22b, 22c, 22d) and top ends of upper upright frame members (24a, 24b, 24c, 24d) are aligned along a substantially vertical axis generally perpendicular to base 12. When collapsible cart 10 is in its collapsed position, as shown in FIG. 7, lower upright frame members (22a, 22b, 22c, 22d) and upper upright frame members (24a, 24b, 24c, 24d) are folded over each other such that they are substantially horizontal. Therefore the orientation of the base hinge assemblies (18a, 18b, 18c, 18d), the upright hinge assemblies (26a, 26b, 26c, 26d) and the top hinge assemblies (30a, 30b, 30c, 30d) permit the upright frame assemblies (21a, 21b, 21c, 21d) to fold over the side regions of base 12. FIG. 5 illustrates one embodiment of collapsible cart 10 wherein collapsible cart 10 is partially collapsed. First upright frame assembly 21a may fold over a first side region of base 12, second upright frame assembly 21b may fold over a second side region of base 12, third upright frame assembly 21c may fold over a third side region of base 12, and fourth upright frame assembly 21d may fold over a fourth side region of base 12. Additionally, when collapsible cart 10 is in its collapsed position, as shown by FIG. 7, first base hinge assembly 18a is proximate first top hinge assembly 30a, second base hinge assembly 18b is proximate second top hinge assembly 30b, third base hinge assembly 18c is proximate third top hinge assembly 30c, and fourth base hinge assembly 18d is proximate fourth top hinge assembly 30d. Accordingly, the manner in which upright frame assemblies (21a, 21b, 21c, 21d) fold when collapsible cart 10 is in its collapsed position, first upright hinge assembly 26a is proximate second base hinge assembly 18b and second top hinge assembly 30b, second upright hinge assembly 26b is proximate third base hinge assembly 18c and third top hinge assembly 30c, third upright hinge assembly 26c is proximate fourth base hinge assembly 18d and forth top hinge assembly 30d, and fourth upright hinge assembly 26d is proximate first base hinge assembly 18a and first top hinge assembly 30a. In certain embodiments, collapsible cart 10 may also include pin 36 attached to top frame 29 and latch 38 attached to base 12 so that collapsible cart 10 can be locked in the folded position. In other embodiments, collapsible cart 10 may also include pin 36 attached to base 12 and latch 38 attached to top frame 29 so that collapsible cart 10 can be locked in the folded position.

While base 12 and top frame 29 of collapsible cart 10 are preferably rectangular or square in shape, as mentioned above, base 12 and top frame, may in other embodiments be in the form of other shapes including, but not limited to, triangular, pentagonal, hexagonal, octagonal, circular, elliptical, etc. In embodiments where base 12 and top frame 29 are not rectangular or square, the plurality of base hinge assembly axes are not disposed substantially orthogonally with respect to one another, the plurality of upright hinge assembly axes are not disposed substantially orthogonally with respect to one another, and the plurality of top hinge assembly axes are not disposed substantially orthogonally with respect to one another. For example, in another embodiment, if base 12 and top frame are triangular in shape, base frame 12 and top frame 29 each have three side regions and three corners. In this embodiment, three base hinge assemblies are disposed at the corner regions of triangular base frame 12. Each of these base hinge assemblies have a base hinge assembly axis, wherein each base hinge assembly axis is horizontally disposed such that it is parallel to base 12. Unlike the preferred embodiment however, the first base hinge axis and the second base hinge axis may be disposed at angles less than 90 degrees, the second base hinge axis and the third base hinge axis may be disposed at angles less than 90 degrees, and the third base hinge axis and the first base hinge axis may be disposed at angles less than 90 degrees. The top hinge assemblies and axes and upright hinge assemblies and axes will be disposed similarly. The orientations of the base hinge assemblies, upright hinge assemblies, and top hinge assemblies allow for the three upright frame assemblies to fold over the three side regions of base 12. For example, in another embodiment, if base 12 and top frame are hexagonal in shape, base frame 12 and top frame 29 each have six side regions and six corner regions. In this embodiment, six base hinge assemblies are disposed at the corner regions of hexagonal base frame 12. Each of these base hinge assemblies have a base hinge assembly axis, wherein each base hinge assembly axis is horizontally disposed such that it is parallel to base 12. Unlike the preferred embodiment however, the first base hinge axis and the second base hinge axis may be disposed at angles greater than 90 degrees, the second base hinge axis and the third base hinge axis may be disposed at angles greater than 90 degrees, the third base hinge axis and the fourth base hinge axis may be disposed at angles greater than 90 degrees, the fourth base hinge axis and the fifth base hinge axis may be disposed at angles greater than 90 degrees, the fifth base hinge axis and the sixth base hinge axis may be disposed at angles greater than 90 degrees, and the sixth base hinge axis and the first base hinge axis may be disposed at angles greater than 90 degrees. The top hinge assemblies and axes and upright hinge assemblies and axes will be disposed similarly. The orientations of the base hinge assemblies, upright hinge assemblies, and top hinge assemblies allow for the six upright frame assemblies to fold over the six side regions of base 12. In yet other embodiments, base frame 12 and top frame 29 may be circular or elliptical. In these embodiments, the number of upright frame assemblies may vary. For example, a collapsible cart 10 with a circular and/or elliptical base 12 and top frame 29 may have four upright frame assemblies wherein each upright frame assembly may be disposed at a corner region of an imaginary square or rectangle bounded by the circular and/or elliptical base 12 and top frame 29. In another embodiment, for example, a collapsible cart 10 with a circular and/or elliptical base 12 and top frame 29 may have six upright frame assemblies wherein each upright frame assembly may be disposed at a corner region of an imaginary hexagon bounded by the circular and/or elliptical base 12 and top frame 29. Accordingly, irrespective of the number of side regions that base 12 and top frame 29 have, it is contemplated that the base hinge assemblies, upright hinge assemblies, and top hinge assemblies will be disposed accordingly to permit the upright frame assemblies to fold over the side regions of base 12. Therefore, the angle between the base, upright and top hinge axes of any one upright frame assembly and the base, upright and top hinge axes of any adjacent upright frame assembly may be substantially equal to 360 degrees divided by the total number of upright frame assemblies. As described above, where there are four upright frame assemblies, the angle between the base, upright and top hinge axes of any one upright frame assembly and the base, upright and top hinge axes of any adjacent upright frame assembly may be substantially 90 degrees (or substantially orthogonal). Therefore, where there are six upright frame assemblies, the angle between the base, upright and top hinge axes of any one upright frame assembly and the base, upright and top hinge axes of any adjacent upright frame assembly may be substantially 60 degrees. Accordingly, when collapsible cart 10 is in the collapsed position, the angle between any one substantially horizontally disposed upright frame assembly and any adjacent substantially horizontally disposed upright frame assembly may be substantially equal to 360 degrees divided by the total number of upright hinge assemblies. Thus, where there are four upright frame assemblies, the angle between any one substantially horizontally disposed upright frame assembly and any adjacent substantially horizontally disposed upright frame assembly may be substantially equal to 90 degrees (or substantially orthogonal). Therefore, where there are six upright frame assemblies, the angle between any one substantially horizontally disposed upright frame assembly and any adjacent substantially horizontally disposed upright frame assembly may be substantially equal to 60 degrees. In certain embodiments, base 12 and top frame 29 may extend horizontally past each upright frame assembly. As such, each upright frame assembly may not be disposed at the absolute corner of base 12 and top frame 29; as described above, upright frame assemblies may be disposed at the corner regions of base 12 and top frame 29.

Figure 6:
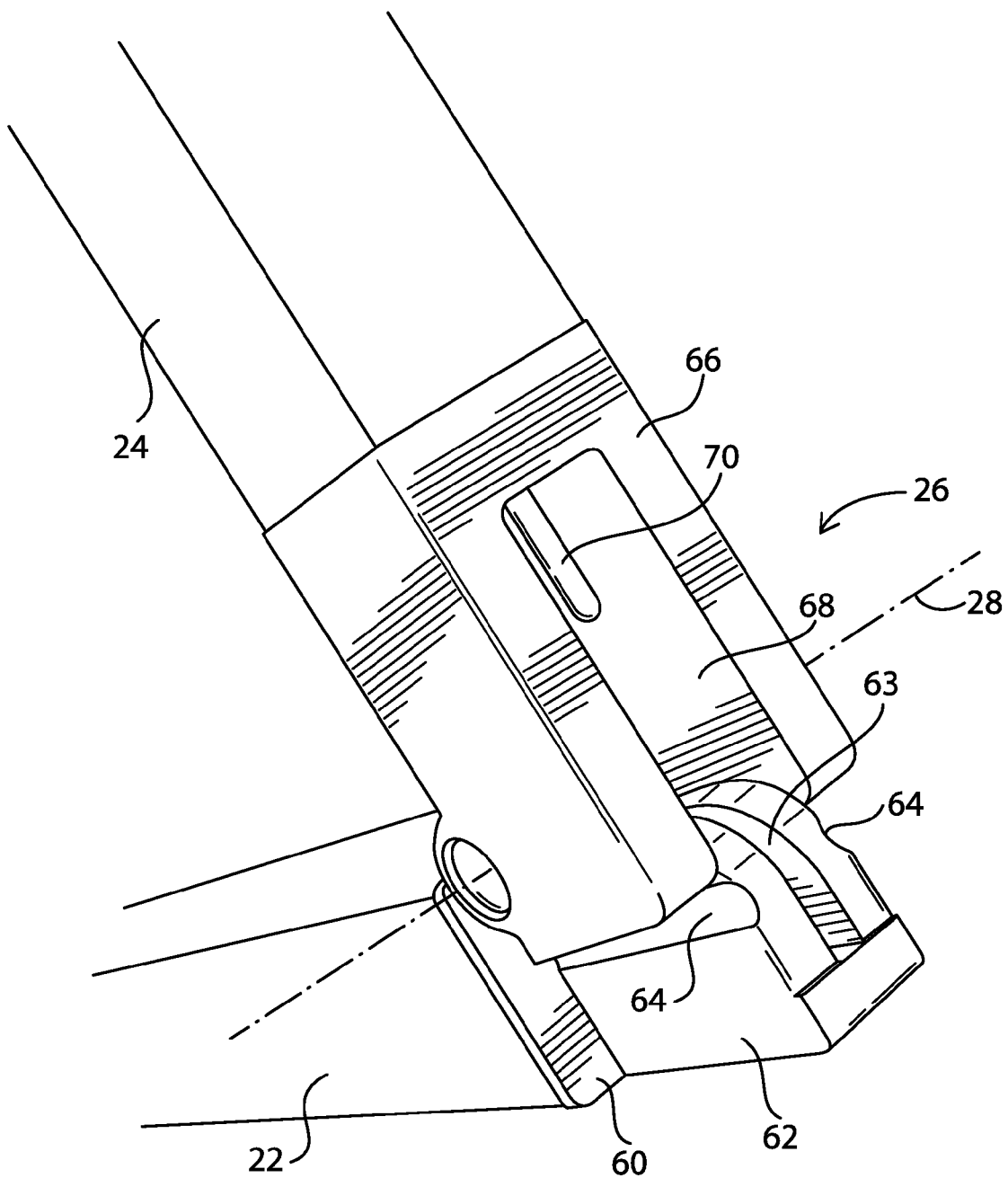
FIG. 6 is a detail view of an upright hinge assembly when the collapsible storage cart is partially collapsed according to one embodiment of the present invention.

In one embodiment, as shown in FIG. 6, each upright hinge assembly (26a, 26b, 26c, 26d) may comprise a lower upright hinge portion 60 and an upper upright hinge portion 66. Lower upright hinge portion 60 comprises a tab 62 that extends substantially orthogonal to upright hinge axis 28 wherein tab 62 has a slot 63 that extends substantially orthogonal to upright hinge axis 28 and parallel to extension of tab 62. Slot 63 in tab 62 makes tab 62 substantially u-shaped such that tab 62 has two sidewalls. In one embodiment, tab 62 also has at least one groove 64 externally disposed on at least one sidewall, wherein groove 64 extends substantially orthogonal to upright hinge axis 28 and parallel to extension of tab 62 and slot 63. Upper upright hinge portion 66 comprises a channel 68 that extends substantially orthogonal to upright hinge axis 28. In one embodiment, channel 68 also has at least one internally disposed rib 70 that extends substantially orthogonal to upright hinge axis 28 and parallel to extension of channel 68. When collapsible cart 10 is in the upright position, tab 62 interfaces with channel 68 and rib 70 engages groove 64. Slot 63 permits some deflection in the sidewalls of tab 62 to enable rib 70 to engage groove 64. The engagement of rib 70 in groove 64 assists in locking lower upright frame members (22a, 22b, 22c, 22d) and upper upright frame members (24a, 24b, 24c, 24d) in a vertical alignment when collapsible cart 10 is in the upright position. In a preferred embodiment of the present invention, each upright hinge assembly (26a, 26b, 26c, 26d) comprises two grooves 64 and two ribs 70. Other lockable hinge constructions and/or structures are contemplated by the present invention, for example, other embodiments may include a spring-loaded pin disposed on tab 62 that inserts into a hole in upper upright hinge portion 66 when the lower upright frame members (22a, 22b, 22c, 22d) and upper upright frame members (24a, 24b, 24c, 24d) are vertically aligned. The pin can be depressed and the upright frame members (22a, 22b, 22c, 22d) and upper upright frame members (24a, 24b, 24c, 24d) can then be folded. In yet other embodiments, a pin and latch similar to pin 36 and latch 38 may also be disposed proximate each upright hinge assembly (26a, 26b, 26c, 26d) which may be locked when collapsible cart 10 is in the upright position preventing the upright hinge assemblies (26a, 26b, 26c, 26d) from rotating. Accordingly, any other hinge construction and/or structure known in the art which permits folding of the upright frame assemblies is also contemplated by the present invention. In another embodiment of the present invention, upright hinge assemblies may be comprised of two hinge plates each having a hinge knuckle through which a hinge pin may be inserted such that the two plates are rotatably connected by the hinge pin. One hinge plate may then be attached to a lower upright frame member and the other hinge plate may then be attached to an upper upright frame member.

Figure 11A:
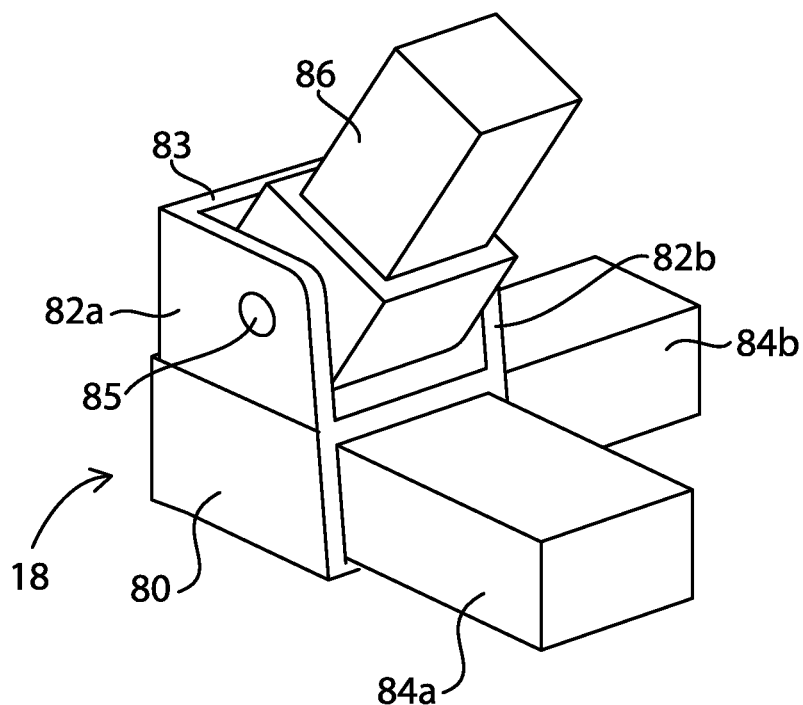
FIG. 11A is a detail view of a hinge assembly according to one embodiment of the present invention.
Figure 11B:
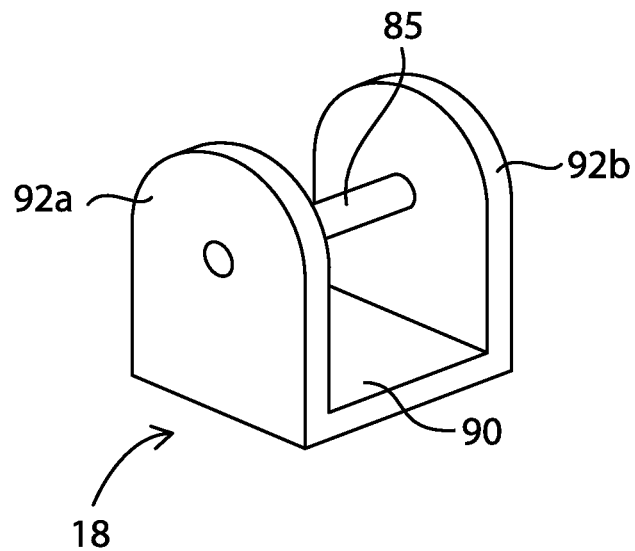
FIG. 11B is a detail view of a hinge assembly according to one embodiment of the present invention.

Referring now to FIGS. 11A and 11B, two possible embodiments of base hinge assemblies (18a, 18b, 18c, 18d) are shown. In FIG. 11A, one embodiment of base hinge assembly 18 comprises hinge body 80 comprising hinge tabs 82a and 82b, hinge stop 83, and extensions 84a and 84b. In certain embodiments, extensions 84a and 84b may be substantially orthogonally disposed to each other. Rotatable extension 86 may be rotatably attached to hinge body 80 via hinge pin 85. Top hinge assemblies (30a, 30b, 30c, 30d) may have similar structures and/or construction. In particular embodiments, extensions 84a and 84b are sized to be inserted into base horizontal rails (17a, 17b, 17c, 17d) and top horizontal rails (34a, 34b, 34c, 34d). In particular embodiments, rotatable extension 86 is sized to be inserted into lower upright frame members (22a, 22b, 22c, 22d) and upper upright frame members (24a, 24b, 24c, 24d). In another embodiment, as illustrated by FIG. 11B, base hinge assembly 18 may comprise hinge base 90, tabs 92a and 92b and hinge pin 85. In this particular embodiment, base hinge assembly 18 may be attached to a base and a lower upright frame member 22 may have a hole through which hinge pin 85 extends, thereby lower upright frame member 22 may be directly rotatably attached to base hinge assembly 18. Top hinge assemblies (30a, 30b, 30c, 30d) may be similarly constructed such that, in certain embodiments, upper upright frame members (24a, 24b, 24c, 24d) may be directly rotatably attached to base hinge assemblies (30a, 30b, 30c, 30d). Any other hinge structure and/or construction known in the art which permits folding of the upright frame assemblies is also contemplated by the present invention.

Figure 4:
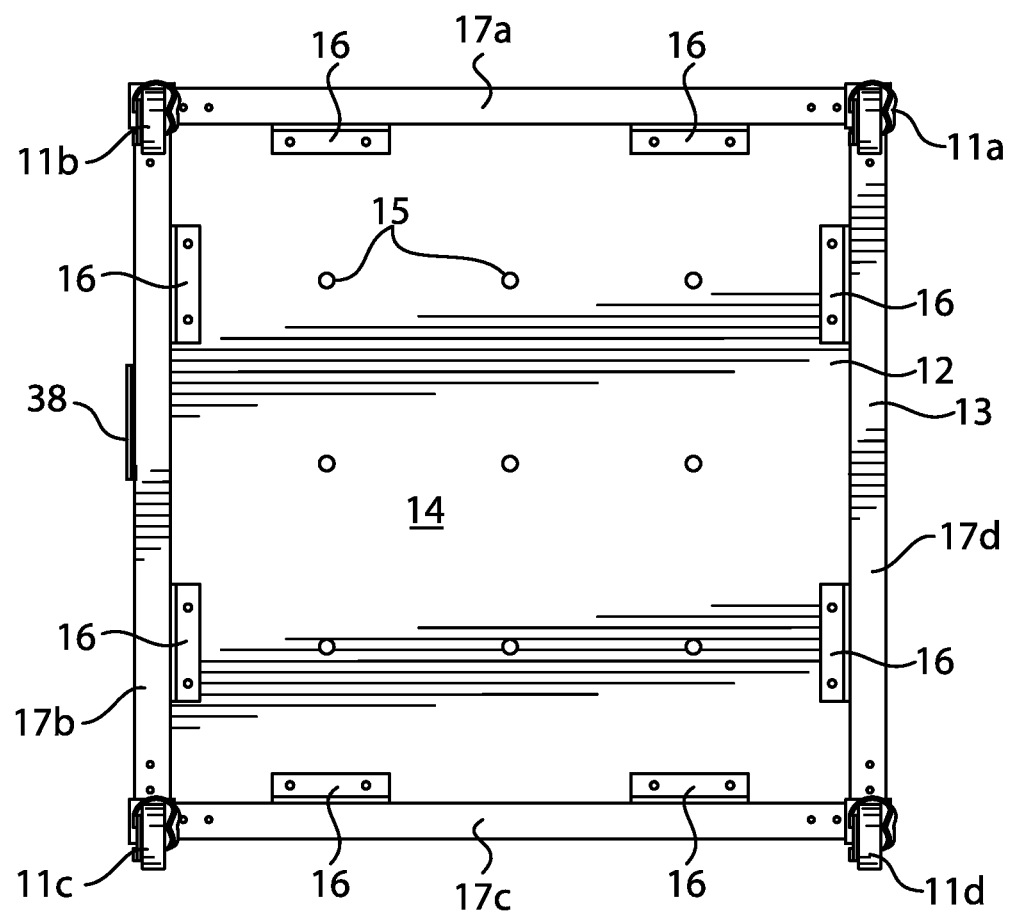
FIG. 4 is a bottom view of the collapsible storage cart according to one embodiment of the present invention.

Referring again to FIGS. 1, 2 and 3, one embodiment of collapsible cart 10 base 12 may further comprise a base plate 14 secured to base frame 13. As shown in FIG. 4, base plate 14 may be secured to base frame 13 via one or more base securing brackets 16. In other embodiments, base plate 14 may be secured to base frame 13 via a variety of means including, but not limited to, securing dimples, screws, rivets, adhesives, welds, brazing, etc. As shown in FIG. 3, one embodiment of base plate 14 may have at least one hole 15. In yet another embodiment, base 12 of collapsible cart 10 may be a unitary part such that base frame, base plate, and base hinge assemblies comprise a single piece. For example, in this embodiment, base 12 may be a unitary part comprised of injection molded plastic. In another embodiment, for example, base 12 may be a unitary part comprised of a variety of metals including, but not limited to, aluminum, steel, stainless steel, titanium, and/or alloys thereof. In yet other embodiments, for example, base 12 may be a unitary part comprised of a variety of other materials including, but not limited to, wood, fiberglass, carbon fiber, graphite, or other composites. Similarly, in certain embodiments, top horizontal rails and top hinge assemblies may be comprise a unitary part. For example, in this embodiment, top horizontal rails and top hinge assemblies may be a unitary part comprised of injection molded plastic. In another embodiment, for example, top horizontal rails and top hinge assemblies may be a unitary part comprised of a variety of metals including, but not limited to, aluminum, steel, stainless steel, titanium, and/or alloys thereof. In yet other embodiments, for example, top horizontal rails and top hinge assemblies may be a unitary part comprised of a variety of other materials including, but not limited to, wood, fiberglass, carbon fiber, graphite, or other composites. In yet another embodiment, hinge assemblies as shown in FIG. 11B may be disposed at the corner regions of a base comprising base horizontal rails connected directly to each other or a base comprised of a unitary part. Similarly, in other embodiments, hinge assemblies as shown in FIG. 11B may be disposed at the corner regions of a top frame comprising top horizontal rails connected directly to each other or a top frame comprised of a unitary part.

In one embodiment of the present invention, for example, base horizontal rails (17a, 17b, 17c, 17d), lower upright frame members (22a, 22b, 22c, 22d), upper upright frame members (24a, 24b, 24c, 24d), and top horizontal rails (34a, 34b, 34c, 34d) may be comprised of a variety of metals including, but not limited to, aluminum, steel, stainless steel, titanium, and/or alloys thereof. In another embodiment, for example, base horizontal rails (17a, 17b, 17c, 17d), lower upright frame members (22a, 22b, 22c, 22d), upper upright frame members (24a, 24b, 24c, 24d), and top horizontal rails (34a, 34b, 34c, 34d) may be comprised of various materials including, but not limited to, wood, plastic, fiberglass, carbon fiber, graphite, or other composites. In one embodiment, for example, base hinge assemblies (18a, 18b, 18c, 18d), upright hinge assemblies (26a, 26b, 26c, 26d), and top hinge assemblies (30a, 30b, 30c, 30d) may be comprised of various materials including, but not limited to, wood, plastic, fiberglass, carbon fiber, graphite, or other composites. In another embodiment, for example base hinge assemblies (18a, 18b, 18c, 18d), upright hinge assemblies (26a, 26b, 26c, 26d), and top hinge assemblies (30a, 30b, 30c, 30d) may be comprised of various metals including, but not limited to, aluminum, steel, stainless steel, titanium, and/or alloys thereof. In one embodiment, for example, base hinge assemblies (18a, 18b, 18c, 18d) and top hinge assemblies (30a, 30b, 30c, 30d) may be identical parts. In one embodiment, for example, base hinge assemblies (18a, 18b, 18c, 18d), upright hinge assemblies (26a, 26b, 26c, 26d), and top hinge assemblies (30a, 30b, 30c, 30d) are inserted into the base horizontal rails (17a, 17b, 17c, 17d), lower upright frame members (22a, 22b, 22c, 22d), upper upright frame members (24a, 24b, 24c, 24d), and top horizontal rails (34a, 34b, 34c, 34d) and secured via a variety of means including, but not limited to, securing dimples, screws, rivets, adhesives, welds, brazing, etc.

In a preferred embodiment, for example, base horizontal rails (17a, 17b, 17c, 17d), lower upright frame members (22a, 22b, 22c, 22d), upper upright frame members (24a, 24b, 24c, 24d), and top horizontal rails (34a, 34b, 34c, 34d) are comprised of extruded aluminum and base hinge assemblies (18a, 18b, 18c, 18d), upright hinge assemblies (26a, 26b, 26c, 26d), and top hinge assemblies (30a, 30b, 30c, 30d) are comprised of plastic. In this preferred embodiment, base hinge assemblies (18a, 18b, 18c, 18d), upright hinge assemblies (26a, 26b, 26c, 26d), and top hinge assemblies (30a, 30b, 30c, 30d) are inserted into the base horizontal rails (17a, 17b, 17c, 17d), lower upright frame members (22a, 22b, 22c, 22d), upper upright frame members (24a, 24b, 24c, 24d), and top horizontal rails (34a, 34b, 34c, 34d) and secured via securing dimples.

In one particular embodiment, base horizontal rails (17a, 17b, 17c, 17d), lower upright frame members (22a, 22b, 22c, 22d), upper upright frame members (24a, 24b, 24c, 24d), and top horizontal rails (34a, 34b, 34c, 34d) are square or rectangular in cross section. In other embodiments, base horizontal rails (17a, 17b, 17c, 17d), lower upright frame members (22a, 22b, 22c, 22d), upper upright frame members (24a, 24b, 24c, 24d), and top horizontal rails (34a, 34b, 34c, 34d) may be any number of cross sectional shapes including, but not limited to, circles, ovals, triangles, pentagons, hexagons, octagons, etc. Accordingly, in one embodiment, for example, base horizontal rails (17a, 17b, 17c, 17d), lower upright frame members (22a, 22b, 22c, 22d), upper upright frame members (24a, 24b, 24c, 24d), and top horizontal rails (34a, 34b, 34c, 34d) may be circular tubing having a diameter of about 10 mm. In one embodiment, for example, base horizontal rails (17a, 17b, 17c, 17d), lower upright frame members (22a, 22b, 22c, 22d), upper upright frame members (24a, 24b, 24c, 24d), and top horizontal rails (34a, 34b, 34c, 34d) may be circular tubing having a diameter of about 12 mm. In another embodiment, for example, base horizontal rails (17a, 17b, 17c, 17d), lower upright frame members (22a, 22b, 22c, 22d), upper upright frame members (24a, 24b, 24c, 24d), and top horizontal rails (34a, 34b, 34c, 34d) may be circular tubing having a diameter of about 14 mm. In yet another embodiment, for example, base horizontal rails (17a, 17b, 17c, 17d), lower upright frame members (22a, 22b, 22c, 22d), upper upright frame members (24a, 24b, 24c, 24d), and top horizontal rails (34a, 34b, 34c, 34d) may be circular tubing having a diameter of about 16 mm. In yet another embodiment, for example, base horizontal rails (17a, 17b, 17c, 17d), lower upright frame members (22a, 22b, 22c, 22d), upper upright frame members (24a, 24b, 24c, 24d), and top horizontal rails (34a, 34b, 34c, 34d) may be circular tubing having a diameter of about 18 mm. In yet another embodiment, for example, base horizontal rails (17a, 17b, 17c, 17d), lower upright frame members (22a, 22b, 22c, 22d), upper upright frame members (24a, 24b, 24c, 24d), and top horizontal rails (34a, 34b, 34c, 34d) may be circular tubing having a diameter of about 20 mm. In yet another embodiment, for example, base horizontal rails (17a, 17b, 17c, 17d), lower upright frame members (22a, 22b, 22c, 22d), upper upright frame members (24a, 24b, 24c, 24d), and top horizontal rails (34a, 34b, 34c, 34d) may be circular tubing having a diameter of about 22 mm. In yet another embodiment, for example, base horizontal rails (17a, 17b, 17c, 17d), lower upright frame members (22a, 22b, 22c, 22d), upper upright frame members (24a, 24b, 24c, 24d), and top horizontal rails (34a, 34b, 34c, 34d) may be circular tubing having a diameter of about 24 mm. In yet another embodiment, for example, base horizontal rails (17a, 17b, 17c, 17d), lower upright frame members (22a, 22b, 22c, 22d), upper upright frame members (24a, 24b, 24c, 24d), and top horizontal rails (34a, 34b, 34c, 34d) may be circular tubing having a diameter of about 26 mm. Accordingly, base horizontal rails (17a, 17b, 17c, 17d), lower upright frame members (22a, 22b, 22c, 22d), upper upright frame members (24a, 24b, 24c, 24d), and top horizontal rails (34a, 34b, 34c, 34d) may be circular tubing having a diameter from about 10 mm to about 26 mm.

As illustrated in FIGS. 1, 2, 3, 4, 5 and 7, one embodiment of collapsible cart 10 comprises caster assemblies (11a, 11b, 11c, 11d) disposed at the corner regions of base 12. In this particular embodiment, for example, the caster assemblies (11a, 11b, 11c, 11d) are screwed into base hinge assemblies (18a, 18b, 18c, 18d). In other embodiments, for example, caster assemblies (11a, 11b, 11c, 11d) may be press fit into base hinge assemblies (18a, 18b, 18c, 18d). In yet other embodiments, caster assemblies (11a, 11b, 11c, 11d) may be secured to base hinge assemblies (18a, 18b, 18c, 18d) via a variety of means including, but not limited to, securing dimples, screws, rivets, adhesives, welds, brazing, etc. In other embodiments, wherein base 12 is a unitary part, caster assemblies (11a, 11b, 11c, 11d) are screwed, press fit, or otherwise secured via a variety of means including, but not limited to screws, rivets, adhesives, welds, brazing, etc. to base 12. In a preferred embodiment, caster assemblies (11a, 11b, 11c, 11d) may be lockable so as to prevent unintended rolling or movement of collapsible cart 10. In certain embodiments, caster assemblies may also swivel along a vertical axis. It is to be understood, that in yet other embodiments, collapsible cart 10 does not have casters.

Figure 8:
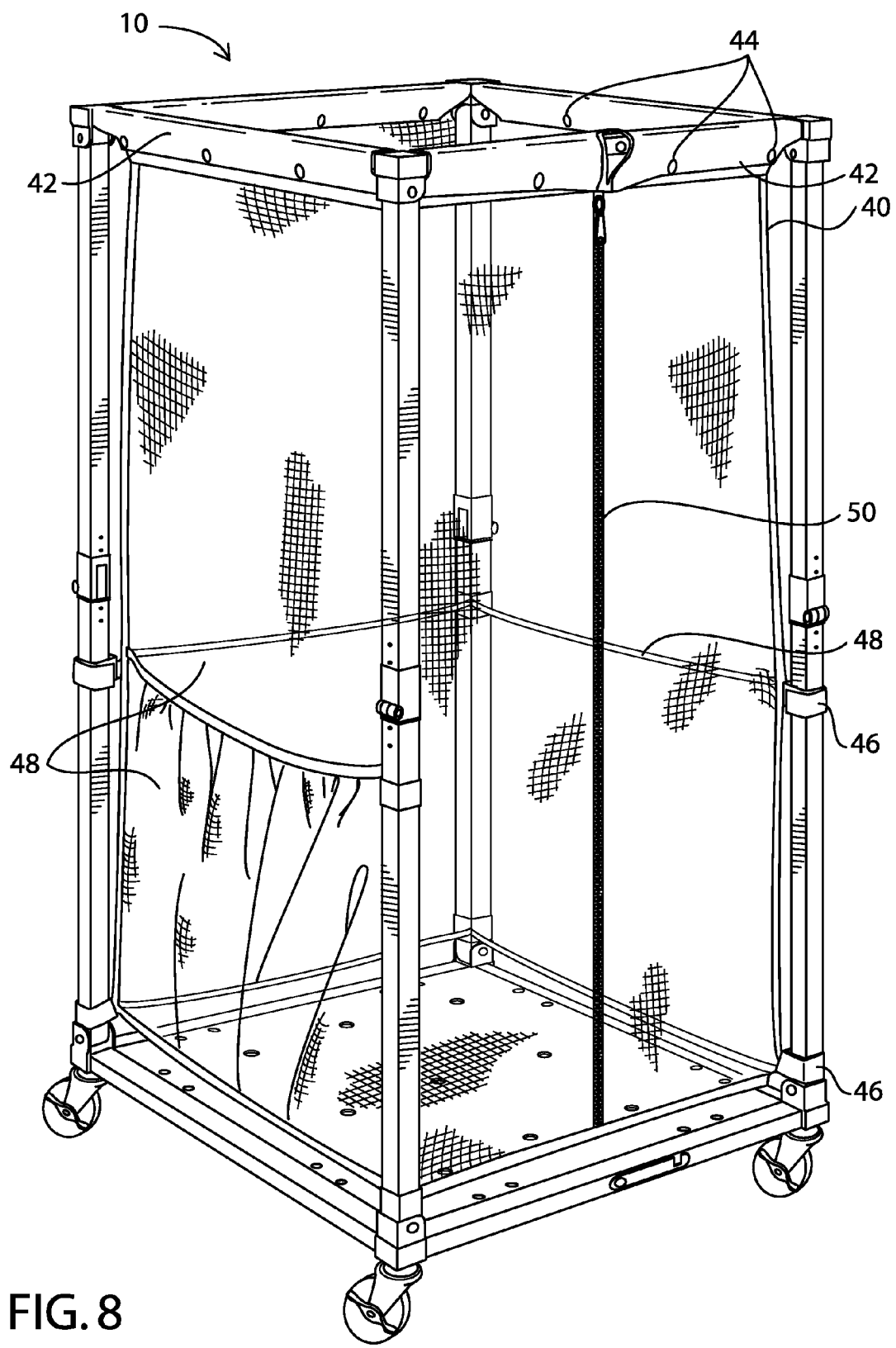
FIG. 8 is a perspective view of the collapsible storage cart in the upright position with a mesh basket affixed to the collapsible storage cart according to one embodiment of the present invention.

In another embodiment of the present invention, as shown in FIG. 8, collapsible cart 10 further includes a basket 40 which may be attached to collapsible cart 10 so that a variety of items can be placed or stored within collapsible cart 10. Basket 40 may be sized to match the size of collapsible cart 10 when collapsible cart 10 is in the upright position. In one particular embodiment, basket 40 may be substantially rectangular wherein basket 40 comprises four side panels, a bottom panel, and an open top. Basket 40 may be comprised of a fine or wide mesh material. In one embodiment, basket 40 may be a net material. In yet other embodiments, basket 40 may be constructed of a wide varieties of materials including, but not limited to, canvas, waxed canvas, polyester fabric and/or blends thereof, cotton fabric and/or blends thereof, water resistant or water proof fabric, clear or opaque plastic (PVC, PET, vinyl, etc.), and/or combinations thereof. Preferably, basket 40 is constructed to permit collapsible cart 10 to fold or collapse without requiring the removal of basket 40. Collapsible cart 10 may then be stored or transported with basket 40 still attached to collapsible cart 10. If desired, basket 40 may be removed in order to easily clean basket 40 or collapsible cart 10. Basket 40 permits a variety of items to be placed or stored within collapsible cart 10. Basket 40 may, in certain embodiments, also include at least one substantially vertical zipper 50 disposed on one side panel, wherein zipper 50 runs from the closed bottom panel to the open top. Zipper 50 may be a have a single zipper pull or a double zipper pull. In other embodiments, basket 40 may be opened and closed using a variety of means, including but not limited to, hook-and-loop fasteners, snaps, magnets, etc. In certain embodiments, basket 40 may also comprise at least one externally disposed pocket 48 for storing items outside basket 40.

According to one embodiment of the present invention, the open top of basket 40 may be permanently or removably secured or attached to top horizontal rails (34a, 34b, 34c, 34d) via top rail securing flaps 42. In one embodiment, for example, at least one, and preferably four, top rail securing flaps 42 include snaps 44 having a male snap portion on one side of flap 42 and a female snap portion on the other side of flap 42 which, when top rail securing flaps 42 are folded over top horizontal rails (34a, 34b, 34c, 34d), the male and female snap portions of snaps 44 can be engaged, thereby securing top rail securing flaps 42 to top horizontal rails (34a, 34b, 34c, 34d). In another embodiment, for example, top rail securing flaps 42 may include a male snap portion and top horizontal rails (34a, 34b, 34c, 34d) may include a female snap portion wherein top rail securing flaps 42 may be secured or attached directly to top horizontal rails (34a, 34b, 34c, 34d) by engaging the snap portions. In yet another embodiment, for example, top rail securing flaps 42 may include a female snap portion and top horizontal rails (34a, 34b, 34c, 34d) may include a male snap portion wherein top rail securing flaps 42 may be secured or attached directly to top horizontal rails (34a, 34b, 34c, 34d) by engaging the snap portions. In yet another embodiment, for example, top rail securing flaps 42 may include a hook-and-loop faster (e.g., Velcro®) which, when top rail securing flaps 42 are folded over top horizontal rails (34a, 34b, 34c, 34d), the hook-and-loop fastener on top rail securing flaps 42 can be engaged, thereby securing or attaching top rail securing flaps 42 to top horizontal rails (34a, 34b, 34c, 34d). In another embodiment, for example, top rail securing flaps 42 may include a hook-and-loop fastener portion and top horizontal rails (34a, 34b, 34c, 34d) may include an opposite hook-and-loop fastener portion wherein top rail securing flaps 42 may be secured or attached directly to top horizontal rails (34a, 34b, 34c, 34d) by engaging the hook-and-loop fastener portions. In yet another embodiment, for example, top rail securing flaps 42 may be secured or attached directly to top horizontal rails (34a, 34b, 34c, 34d) via a variety of means including, but not limited to, securing dimples, screws, rivets, adhesives, welds, brazing, magnets, etc.

In order to assist securing basket 40 to collapsible cart 10, at least one basket securing strap 46 may be attached at various locations on basket 40. Basket securing straps 46 can be folded over upright frame assemblies (21a, 21b, 21c, 21d) to prevent excessive movement of basket 40. In one embodiment, basket securing straps 46 can be hook-and-loop fasteners which engage one another when folded over upright frame assemblies (21a, 21b, 21c, 21d). In another embodiment, for example, basket securing straps 46 may include a hook-and-loop fastener portion and upright frame assemblies (21a, 21b, 21c, 21d) may include an opposite hook-and-loop fastener portion wherein basket securing straps 46 may be secured directly to upright frame assemblies (21a, 21b, 21c, 21d) by engaging the hook-and-loop fastener portions. In another embodiment, for example, basket securing straps 46 may include snaps having a male snap portion on one side of strap 46 and a female snap portion on the other side of strap 46 which, when basket securing straps 46 are folded over to upright frame assemblies (21a, 21b, 21c, 21d), the male and female snap portions of snaps can be engaged, thereby securing basket securing straps 46 to upright frame assemblies (21a, 21b, 21c, 21d). In another embodiment, for example, basket securing straps 46 may include a male snap portion and upright frame assemblies (21a, 21b, 21c, 21d) may include a female snap portion wherein basket securing straps 46 may be secured directly to upright frame assemblies (21a, 21b, 21c, 21d) by engaging the snap portions. In yet another embodiment, for example, basket securing straps 46 may include a female snap portion and upright frame assemblies (21a, 21b, 21c, 21d) may include a male snap portion wherein basket securing straps 46 may be secured directly to upright frame assemblies (21a, 21b, 21c, 21d) by engaging the snap portions. In yet other embodiments, basket securing straps 46 may be tied to upright frame assemblies (21a, 21b, 21c, 21d).

In a preferred embodiment, basket 40 is constructed of mesh and permits the storage and organization of pool items including, but not limited to, pool noodles, pool toys, flotation devices, goggles, flippers, etc. Such items may be placed in basket 40 of collapsible cart 10 when wet and due to the open nature of the mesh, air is permitted to flow around and through the stored items thereby drying the stored items. Additionally, base holes 15 permit water from such stored items to drain through base 12 of collapsible cart 10.

In another embodiment, basket 40 permits the storage and organization of sports equipment including, but not limited to, basketballs, volleyballs, hockey equipment, golf equipment, baseballs, tennis balls, footballs, etc. In this particular embodiment, basket 40 may not extend all the way down to base 12 of collapsible cart. In one embodiment, for example, basket 40 may extend down from top frame 29 about a quarter of the length of upright frame assemblies (21a, 21b, 21c, 21d). In another embodiment, for example, basket 40 may extend down from top frame 29 about a third of the length of upright frame assemblies (21a, 21b, 21c, 21d). In yet another embodiment, for example, basket 40 may extend down from top frame 29 about one half of the length of upright frame assemblies (21a, 21b, 21c, 21d). In yet another embodiment, for example, basket 40 may extend down from top frame 29 about two thirds of the length of upright frame assemblies (21a, 21b, 21c, 21d). In yet another embodiment, for example, basket 40 may extend down from top frame 29 about three fourths of the length of upright frame assemblies (21a, 21b, 21c, 21d). Accordingly, in certain embodiments, basket 40 may extend down from top frame 29 about one quarter to about the full length of upright frame assemblies (21a, 21b, 21c, 21d). A shorter basket 40 may be filled with a plurality of sport balls (e.g., tennis balls, footballs, baseballs, golf balls, hockey pucks, etc.) such that a person can have a supply of sport balls for practicing a particular sport wherein the sport balls are raised off the ground to a height that is comfortable and easy for the person to reach and due to the shorter basket 40, the person does not have to reach all the way down to base 12 to grab another ball. Such a particular collapsible cart 10 with shorter basket 40 may be particularly useful for tennis practice, batting practice, throwing practice or the like. In yet another embodiment, basket 40 permits the storage and organization of clothing items such that collapsible cart 10 can be used as a laundry hamper. In yet another embodiment, basket 40 permits the storage and organization of household items including, but not limited to, brooms mops, buckets, etc. In yet other embodiments, collapsible cart 10 may have more than one basket 40 so that items can be sorted such as, for example, clothes, sports equipment, etc. In one embodiment, for example, collapsible cart 10 has two baskets 40. In another embodiment, for example, collapsible cart 10 has three baskets 40. In yet another embodiment, for example, collapsible cart 10 has four baskets 40. Accordingly, collapsible cart 10 may have from one basket 40 to four baskets 40.

In certain other embodiments, a table top may be affixed to or placed on top frame 29. In one embodiment, the table top may be hinged to permit access to basket 40 without requiring the removal of the table top. Additionally, collapsible cart 10 with a table top may be used, for example, as a card table or as a camping table.

It is to be understood that the structure and construction of collapsible cart 10 can be used in a wide variety of ways with a wide variety of attachments for storage, organization, etc. Additionally, in another embodiment, the structure and construction of collapsible cart 10 can be used in a variety of other ways, including, but not limited to, as a folding tent, a pop up canopy, a hunting blind, a portable toilet, a camping shower, etc. In these particular embodiments, one or more panels can be removably or permanently attached or secured to collapsible cart 10 to provide shelter from the elements, camouflage, privacy, etc. These panels may be constructed of a wide varieties of materials including, but not limited to, canvas, waxed canvas, polyester fabric and/or blends thereof, cotton fabric and/or blends thereof, water resistant or water proof fabric, clear or opaque plastic (PVC, PET, vinyl, etc.), and/or combinations thereof. Preferably, the panels are constructed to permit collapsible cart 10 to fold or collapse without removing the panels. Collapsible cart 10 may then be stored or transported with the panels still attached to collapsible cart 10. If desired, the panels may be removed in order to easily clean the panels or collapsible cart. The panels may be permanently or removably attached to collapsible cart 10 in similar fashions as described above with respect to attaching basket 40 to collapsible cart 10 (e.g., flaps with snaps, hook-and-loop fasteners, magnets, etc.).

Figure 9:
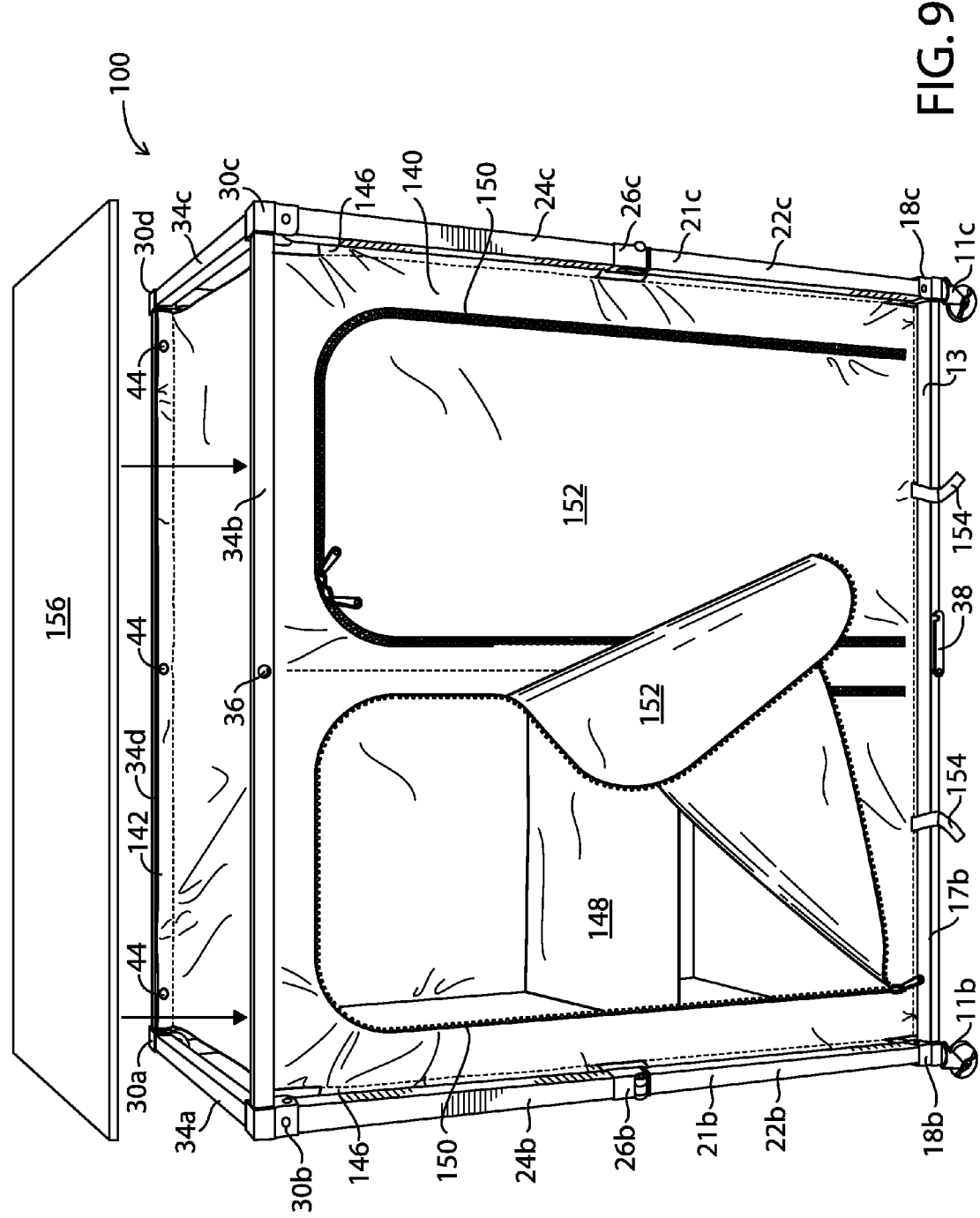
FIG. 9 is a perspective view of a collapsible bar cart according to one embodiment of the present invention.

As illustrated by FIG. 9, another embodiment of the present invention is directed to a collapsible bar cart 100 comprising a storage envelope 140 and a table top 156. Accordingly, this embodiment of the collapsible cart can be used as a portable bar cart or portable table wherein food, drinks, cups, plates, utensils, etc. can be stored in the storage envelope or placed on top of the table top. Such collapsible bar cart could be used for tailgating at a sporting event, at a pool or beach, or at a variety of other outdoor or indoor activities. In this particular embodiment, collapsible bar cart 100 comprises substantially the same structures and hinge assemblies as collapsible cart 10. Base 12 and top frame 29 of collapsible bar cart 100 may be square in shape, however they are preferably rectangular wherein second and fourth base horizontal rails 17b and 17d and second and fourth top horizontal rails 34b and 34d are each longer than first and third base horizontal rails 17a and 17c and first and third top horizontal rails 34a and 34c, or vice versa.

Storage envelope 140 can be attached to collapsible bar cart 100 and a rectangular table top 156 can be affixed to or placed on top frame 29. Storage envelope 140 may be closed on all sides or it may have an open top similar to basket 40. Storage envelope 140 further defines an internal compartment which may be accessible via one or more panels 152 which may be opened; panels 152 may be stowed when opened using straps 154. Straps may have hook-and-loop fasteners, snaps, or may tie to stow panels 152. Panels may be opened and closed via zippers 150. Zippers 150 may be a have a single zipper pull or a double zipper pull. In other embodiments, panels 150 may be opened and closed via a variety of means including, but not limited to, hook-and-loop fasteners, snaps, magnets, etc. Additionally, storage envelope 100 may have at least one or more internal shelves 148 permanently or removably attached to storage envelope via a variety of means including, but not limited to, hook-and-loop fasteners, snaps, rivets, adhesives, stitching, magnets, etc. Similar to basket 40, storage envelope 140 may be constructed of a wide varieties of materials including, but not limited to, open mesh, canvas, waxed canvas, polyester fabric and/or blends thereof, cotton fabric and/or blends thereof, water resistant or water proof fabric, clear or opaque plastic (PVC, PET, vinyl, etc.), and/or combinations thereof. Preferably, storage envelope 140 is constructed to permit collapsible bar cart 100 to fold or collapse without requiring the removal of storage envelope 140. Collapsible bar cart 100 may then be stored or transported with storage envelope 140 still attached to collapsible bar cart 100. If desired, storage envelope 140 may be removed in order to easily clean storage envelope 140 or collapsible bar cart 100.

Storage envelope 140 may be permanently or removably attached to collapsible bar cart 100 in similar fashions as described above with respect to attaching basket 40 to collapsible cart 10 (e.g., flaps with snaps, hook-and-loop fasteners, etc.). Preferably, storage envelope 140 is attached directly to top horizontal rails (34a, 34b, 34c, 34d) and upright frame assemblies (21a, 21b, 21c, 21d) via snaps 44. In this embodiment, for example, top rail securing flaps 142 and vertical securing flaps 146 may include a male snap portion and top horizontal rails (34a, 34b, 34c, 34d) and upright frame assemblies (21a, 21b, 21c, 21d) may include a female snap portion wherein top rail securing flaps 142 and vertical securing flaps 146 may be secured or attached directly to top horizontal rails (34a, 34b, 34c, 34d) and upright frame assemblies (21a, 21b, 21c, 21d) by engaging the snap portions. In another embodiment, for example, top rail securing flaps 142 and vertical securing flaps 146 may include a female snap portion and top horizontal rails (34a, 34b, 34c, 34d) and upright frame assemblies (21a, 21b, 21c, 21d) may include a male snap portion wherein top rail securing flaps 142 and vertical securing flaps 146 may be secured or attached directly to top horizontal rails (34a, 34b, 34c, 34d) and upright frame assemblies (21a, 21b, 21c, 21d) by engaging the snap portions. In yet another embodiment, for example, top rail securing flaps 142 and vertical securing flaps 146 may be secured or attached directly to top horizontal rails (34a, 34b, 34c, 34d) and upright frame assemblies (21a, 21b, 21c, 21d) via a variety of means including, but not limited to, screws, rivets, adhesives, magnets, etc.

Similar to collapsible cart 10, collapsible bar cart 100 may also include casters (11a, 11b, 11c, 11d) disposed at the corner regions of base 12, wherein the casters may be lockable. In certain embodiments, casters may swivel about a vertical axis. Collapsible bar cart 100 may also include one or more of pin 36 and latch 38 so that collapsible bar cart 100 can be locked in the folded position.

Collapsible cart 10 may, in other embodiments, include a cutting board and/or serving tray top which, like table top 156, can be affixed to or placed on top frame 29. Furthermore, this embodiment, may also include a cooler secured or attached to top frame 29 or to upright frame assemblies (21a, 21b, 21c, 21d) for storing food and/or drinks.

The cooler may be constructed of a wide varieties of materials including, but not limited to, canvas, waxed canvas, polyester fabric and/or blends thereof, cotton fabric and/or blends thereof, water resistant or water proof fabric, clear or opaque plastic (PVC, PET, vinyl, etc.), and/or combinations thereof. Preferably, the cooler is constructed to permit collapsible cart 10 to fold or collapse without removing the cooler. Collapsible cart 10 may then be stored or transported with the cooler still attached to collapsible cart 10. If desired, the cooler may be removed in order to easily clean the cooler or collapsible cart. The cooler may be permanently or removably attached to collapsible cart 10 in similar fashions as described above with respect to attaching basket 40 to collapsible cart 10 and storage envelope 140 to collapsible bar cart 100 (e.g., flaps with snaps, hook-and-loop fasteners, magnets, etc.).

Figure 10:
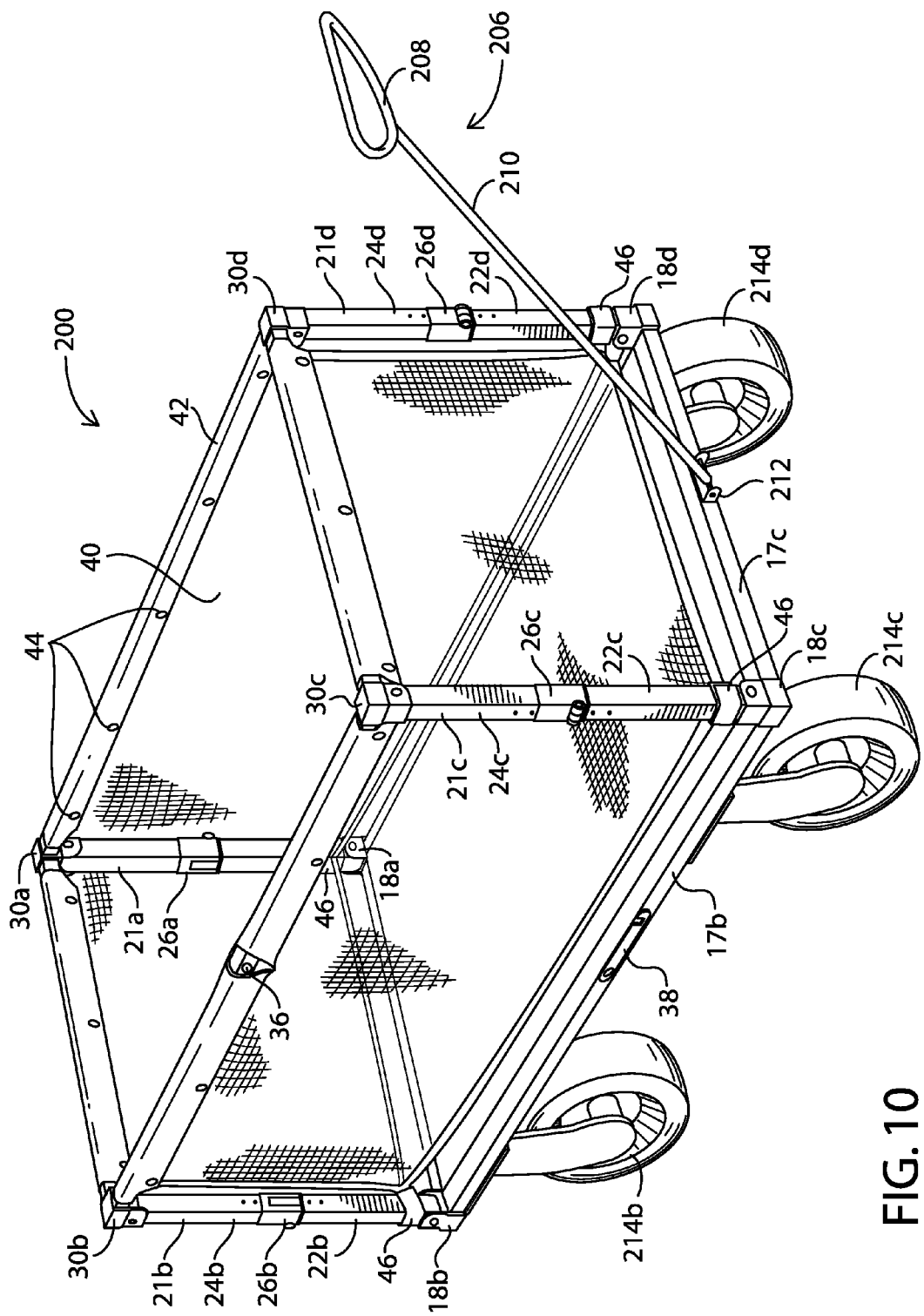
FIG. 10 is a perspective view of a collapsible wagon according to one embodiment of the present invention.

As illustrated by FIG. 10, another embodiment of the present invention is directed to a collapsible wagon 200 comprising a basket 40, wheel assemblies (214a, 214b, 214c, 214d), and a handle 206. Accordingly, this embodiment of the collapsible cart can be used as a wagon to transport items. In this particular embodiment, collapsible wagon 200 comprises substantially the same structures and hinge assemblies as collapsible cart 10. Base 12 and top frame 29 of collapsible bar cart 100 may be square in shape, however they are preferably rectangular wherein second and fourth base horizontal rails 17b and 17d and second and fourth top horizontal rails 34b and 34d are each longer than first and third base horizontal rails 17a and 17c and first and third top horizontal rails 34a and 34c, or vice versa.

Again basket 40 may be constructed of a wide varieties of materials including, but not limited to, open mesh, canvas, waxed canvas, polyester fabric and/or blends thereof, cotton fabric and/or blends thereof, water resistant or water proof fabric, clear or opaque plastic (PVC, PET, vinyl, etc.), and/or combinations thereof. Preferably, basket 40 is constructed to permit collapsible wagon 200 to fold or collapse without removing basket 40. Collapsible wagon 200 may then be stored or transported with basket 40 still attached to collapsible wagon 200. If desired, basket 40 may be removed in order to easily clean basket 40 or collapsible wagon 200. Basket 40 may be permanently or removably attached to collapsible wagon 200 in similar fashions as described above with respect to attaching basket 40 to collapsible cart 10 or storage envelope 140 to collapsible bar cart 100 (e.g., flaps with snaps, hook-and-loop fasteners, magnets, etc.).

In this particular embodiment, collapsible wagon 200 may also include wheel assemblies (214a, 214b, 214c, 214d) disposed at the corner regions of base 12. Wheel assemblies (214a, 214b, 214c, 214d) may comprise wheels including, but not limited to, pneumatic tires, solid rubber tires, foam rubber tires, hard plastic tires, etc. that enable collapsible wagon 200 to be rolled over smooth and rough terrain alike. Wheel assemblies 214a and 214b opposite handle 206 may be fixed such that they cannot swivel about a vertical axis while wheel assemblies 214c and 214d proximate handle 206 may swivel about a vertical axis. In another embodiment, for example all wheel assemblies (214a, 214b, 214c, 214d) may swivel about a vertical axis. In certain embodiments, for example, wheel assemblies (214a, 214b, 214c, 214d) may be detachable or foldable in order to maintain ease of storage and/or transportation of collapsible wagon 200.

Handle 206 may comprise a handle portion 208 and a handle body portion 210. Handle 206 may be permanently or removably attached to base 12 via hinge 212, a clevis and pin, or any other means known in the art. Handle 206 in certain embodiments may comprise a hinge assembly disposed along handle body portion 210 to permit the handle to fold for ease of storage and/or transportation. Collapsible wagon 200 may also include pin 36 and latch 38 so that collapsible wagon 200 can be locked in the folded position.

In another embodiment, collapsible cart 10 may be used as a collapsible closet wherein a horizontal bar may be attached to top frame 29 that is parallel to a first top horizontal rail 34a and a third horizontal rail 34c and substantially orthogonal to second horizontal rail 34b and fourth horizontal rail 34d wherein a first end of the horizontal bar is attached at about the midpoint of second horizontal rail 34b and a second end of the horizontal bar is attached at about the midpoint of fourth horizontal rail 34d. Alternatively, horizontal bar may be attached to top frame 29 that is parallel to a second top horizontal rail 34b and a fourth horizontal rail 34d and substantially orthogonal to first horizontal rail 34a and third horizontal rail 34c wherein a first end of the horizontal bar is attached at about the midpoint of first horizontal rail 34a and a second end of the horizontal bar is attached at about the midpoint of third horizontal rail 34c. Clothes on hangers may then be hung from the horizontal bar when the collapsible closet is in the upright position. Additionally, in certain embodiments, the collapsible closet may be used as a drying rack wherein wet clothes on hangers can be hung from top frame 29. In this particular embodiment, collapsible closet may include horizontal bar or horizontal bar may be omitted.

In certain embodiments, a storage envelope may be placed over or attached to the collapsible closet, wherein the storage envelope may have four side panels, a closed top and an open bottom. One side may comprise clear plastic or PVC and may also include at least one substantially vertical zipper disposed on the clear side panel, wherein the zipper runs from the closed bottom panel to the open top. The zipper may be a have a single zipper pull or a double zipper pull. In other embodiments, storage envelope may be opened and closed using a variety of means, including but not limited to, hook-and-loop fasteners, snaps, magnets, etc.

Again the storage envelope may be constructed of a wide varieties of materials including, but not limited to, open mesh, canvas, waxed canvas, polyester fabric and/or blends thereof, cotton fabric and/or blends thereof, water resistant or water proof fabric, clear or opaque plastic (PVC, PET, vinyl, etc.), or combinations thereof. Preferably, the storage envelope is constructed to permit collapsible closet to fold or collapse without removing the storage envelope. Collapsible closet may then be stored or transported with the storage envelope still attached to the collapsible closet. If desired, the storage envelope may be removed in order to easily clean the storage envelope or the collapsible closet.

The storage envelope may be permanently or removably attached to collapsible closet in similar fashions as described above with respect to attaching basket 40 to collapsible cart 10 or storage envelope 140 to collapsible bar cart 100 (e.g., flaps with snaps, hook-and-loop fasteners, magnets, etc.).

In yet another embodiment, one or more shelves and/or baskets may be secured or attached to collapsible cart 10 wherein the shelves and/or baskets may be used to store items when collapsible cart 10 is in the upright position. The shelves and/or baskets may be used to store a variety of items including, but not limited to, boxes, recycle bins, food, tools, sports equipment, household items, gardening equipment, shoes, clothes, etc. A variety of shelving and basket types and materials may be used including, but not limited to, various fabrics, wire mesh, plastic, wood, metal, composite, and/or combinations thereof. The shelves and/or baskets may be permanently or removably attached via a variety of means including, but not limited to, a slot and pin connection, screws, rivets, adhesives, hook-and-loop fasteners, snaps, magnets, etc. In one embodiment, for example, the shelves may be wire mesh shelves that have pins that interface with slots in the upright frame members in order to attach the shelves to collapsible cart 10. In another embodiment, for example, the baskets may be wire mesh baskets that have pins that interface with slots in the upright frame members in order to attach the shelves to collapsible cart 10. In certain embodiments, a storage envelope may be placed over or attached to collapsible cart 10, wherein the storage envelope may have four side panels, a closed top and an open bottom. One side may comprise clear plastic or PVC and may also include at least one substantially vertical zipper disposed on the clear side panel, wherein the zipper runs from the closed bottom panel to the open top. The zipper may be a have a single zipper pull or a double zipper pull. In other embodiments, storage envelope may be opened and closed using a variety of means, including but not limited to, hook-and-loop fasteners, snaps, magnets, etc.

In another embodiment, directed at holding shoes, storage envelope may comprise a plurality of shelves that are affixed to storage envelope which may be sized to fit a pair of shoes. In this particular embodiment, the storage envelope may have a closed top, a closed bottom and four sides, wherein each side has a plurality of horizontal shelves arranged on one vertical half of each side. Therefore, each side of the storage envelope can receive and store one quarter of the total number of pairs of shoes that the entire storage envelope can receive and store. In this embodiment, shoes can be placed on the shelves from each of the four sides of storage envelope. In one embodiment, for example, the shelves of the storage envelope are sized to permit the storage of a total of 28 pairs of shoes and each side of the storage envelope can store 7 pairs of shoes. In other embodiments, each side has a plurality of horizontal shelves arranged on two vertical halves of two sides. Therefore, each side of the storage envelope can receive and store half of the total number of pairs of shoes that the entire storage envelope can receive and store. In this embodiment, shoes can be placed on the shelves from two of the four sides of the storage envelope. In one embodiment, for example, the shelves of the storage envelope are sized to permit the storage of a total of 28 pairs of shoes and two sides of the storage envelope can each store 14 pairs of shoes. In other embodiments, the dimensions and number shelves can be altered to permit the storage of more or less than 28 pairs of shoes.

Again the storage envelope may be constructed of a wide varieties of materials including, but not limited to, open mesh, canvas, waxed canvas, polyester fabric and/or blends thereof, cotton fabric and/or blends thereof, water resistant or water proof fabric, clear or opaque plastic (PVC, PET, vinyl, etc.), or combinations thereof. Preferably, the storage envelope is constructed to permit collapsible cart to fold or collapse without removing the storage envelope. Collapsible cart may then be stored or transported with the storage envelope still attached to the collapsible cart. If desired, the storage envelope may be removed in order to easily clean the storage envelope or the collapsible cart.

The storage envelope may be permanently or removably attached to collapsible cart in similar fashions as described above with respect to attaching storage envelope 140 or basket 40 to collapsible cart 10 or collapsible bar cart 100 (e.g., flaps with snaps, hook-and-loop fasteners, magnets, etc.).

Collapsible cart 10, in other embodiments, may also have hanging storage panels attached which permit the storage and organization of a wide variety of items. Hanging storage panels are similar to hanging shoe racks which are known in the art. In certain embodiments, the hanging storage panels may have a plurality of pockets which can store a variety of items including, but not limited to, shoes, hats, gloves, sports balls, sports equipment, brooms, mops, dust pans, rakes, shovels, hoes, gift wrap rolls and related items (e.g., tissue paper, tape, gift bags, gift tags, labels, scissors, etc.), packing and shipping related items (e.g., scissors, tape, bubble wrap, collapsed boxes, packing peanuts, etc.). The plurality of hanging storage panels may be a variety of different sizes to accommodate the wide variety of items. In one embodiment, for example, the hanging storage panels may extend down from the top frame about a quarter of the length of the upright frame assemblies. In another embodiment, for example, the hanging storage panels may extend down from the top frame about a third of the length of the upright frame assemblies. In yet another embodiment, for example, the hanging storage panels may extend down from the top frame about one half of the length of the upright frame assemblies. In yet another embodiment, for example, the hanging storage panels may extend down from the top frame about two thirds of the length of the upright frame assemblies. In yet another embodiment, for example, the hanging storage panels may extend down from the top frame about three fourths of the length of the upright frame assemblies. Accordingly, in certain embodiments, the hanging storage panels may extend down from the top frame about one quarter to about the full length of the upright frame assemblies. Additionally, the plurality of pockets may be shorter or wider to accommodate the wide variety of items. In one embodiment, for example, the pockets may extend down from the top frame about a quarter of the length of the upright frame assemblies. In another embodiment, for example, the pockets may extend down from the top frame about a third of the length of the upright frame assemblies. In yet another embodiment, for example, the pockets may extend down from the top frame about one half of the length of the upright frame assemblies. In yet another embodiment, for example, the pockets may extend down from the top frame about two thirds of the length of the upright frame assemblies. In yet another embodiment, for example, the pockets may extend down from the top frame about three fourths of the length of the upright frame assemblies. Accordingly, in certain embodiments, the pockets may extend down from the top frame about one quarter to about the full length of the upright frame assemblies.

The hanging storage panel may be constructed of a wide varieties of materials including, but not limited to, open mesh, canvas, waxed canvas, polyester fabric and/or blends thereof, cotton fabric and/or blends thereof, water resistant or water proof fabric, clear or opaque plastic (PVC, PET, vinyl, etc.), or combinations thereof. Preferably, the hanging storage panel is constructed to permit collapsible cart to fold or collapse without removing the hanging storage panel. Collapsible cart may then be stored or transported with the hanging storage panel still attached to the collapsible cart. If desired, the hanging storage panel may be removed in order to easily clean the hanging storage panel or the collapsible cart.

The hanging storage panel may be permanently or removably attached to collapsible cart in similar fashions as described above with respect to attaching storage envelope 140 or basket 40 to collapsible cart 10 or collapsible bar cart 100 (e.g., flaps with snaps, hook-and-loop fasteners, magnets, etc.).

Various features of the described invention have been shown and described in connection with the illustrated embodiments. However, it is to be understood that these features are presented herein as being illustrative of the subject invention, and that the scope of the invention is to be determined by the appended claims.

The invention claimed is:

1. A collapsible cart, comprising:
a) a base comprising a first side region, a second side region, a third side region, and a fourth side region, and a first corner region, a second corner region, a third corner region and a forth corner region, and
   i) wherein a first base hinge assembly is disposed at the first corner region, a second base hinge assembly is disposed at the second corner region, a third base hinge assembly is disposed at the third corner region and a fourth base hinge assembly is disposed at the fourth corner region, and
   ii) wherein the first base hinge assembly has a first base hinge axis, the first base hinge axis horizontally disposed, the second base hinge assembly has a second base hinge axis, the second base hinge axis horizontally disposed and substantially orthogonal to the first base hinge axis, the third base hinge assembly has a third base hinge axis, the third base hinge axis horizontally disposed and substantially orthogonal to the second base hinge axis, and the fourth base hinge assembly has a fourth base hinge axis, the forth base hinge axis horizontally disposed and substantially orthogonal to the third base hinge axis,
b) a first upright frame assembly rotatably connected to the first base hinge assembly, a second upright frame assembly rotatably connected to the second base hinge assembly, a third upright frame assembly rotatably connected to the third base hinge assembly, and a fourth upright frame assembly rotatably connected to the fourth base hinge assembly,
   i) wherein the first upright frame assembly comprises a lower upright frame member, an upper upright frame member and a first upright hinge assembly disposed there between, the second upright frame assembly comprises a lower upright frame member, an upper upright frame member and a second upright hinge assembly disposed there between, the third upright frame assembly comprises a lower upright frame member, an upper upright frame member and a third upright hinge assembly disposed there between, and the fourth upright frame assembly comprises a lower upright frame member, an upper upright frame member and a fourth upright hinge assembly disposed there between, and
   ii) wherein the first upright hinge assembly has a first upright hinge axis, the first upright hinge axis horizontally disposed and parallel to the first base hinge axis, the second upright hinge assembly has a second upright hinge axis, the second upright hinge axis horizontally disposed and parallel to the second base hinge axis, the third upright hinge assembly has a third upright hinge axis, the third upright hinge axis horizontally disposed and parallel to the third base hinge axis, and the fourth upright hinge assembly has a fourth upright hinge axis, the forth upright hinge axis horizontally disposed and parallel to the fourth base hinge axis,
c) a top frame comprising a first side region, a second side region, a third side region, and a fourth side region, and a first corner region, a second corner region, a third corner region and a forth corner region,
   i) wherein a first top hinge is disposed at the first corner region and rotatably connected with the first upright frame assembly, a second top hinge assembly is disposed at the second corner region and rotatably connected with the second upright frame assembly, a third top hinge assembly is disposed at the third corner region and rotatably connected with the third upright frame assembly, and a fourth top hinge assembly is disposed at the fourth corner region and rotatably connected with the fourth upright frame assembly, and
   ii) wherein the first top hinge assembly has a first top hinge axis, the first top hinge axis horizontally disposed and parallel to the first base hinge axis, the second top hinge assembly has a second top hinge axis, the second top hinge axis horizontally disposed and parallel to the second base hinge axis, the third top hinge assembly has a third top hinge axis, the third top hinge axis horizontally disposed and parallel to the third base hinge axis, and the fourth top hinge assembly has a fourth top hinge axis, the forth top hinge axis horizontally disposed and parallel to the fourth base hinge axis;
d) such that the above orientation of the first, second, third and fourth base hinge assemblies, first, second, third and fourth upright hinge assemblies, and the first, second, third and fourth top hinge assemblies permit folding of the collapsible cart wherein the first upright frame assembly folds over the first side region of the base, the second upright frame assembly folds over the second side region of the base, the third upright frame assembly folds over the third side region of the base, and the fourth upright frame assembly folds over the fourth side region of the base;
e) four casters wherein one caster is disposed at each corner region of the base, wherein the casters are opposite the four upright frame assemblies;
f) a substantially rectangular storage receptacle attached to the top frame and to one or more of the plurality of upright frame assemblies, wherein the storage receptacle comprises a storage envelope defining an internal compartment and wherein at least one shelf is disposed in the internal compartment; and
g) a table top placed on or attached to the top frame.

2. The collapsible cart of claim 1, wherein the base comprises a first horizontal base rail, a second horizontal base rail, a third horizontal base rail, and a fourth horizontal base rail and the top frame comprises a first horizontal top rail, a second horizontal top rail, a third horizontal top rail, and a fourth horizontal top rail.

3. The collapsible cart of claim 1, wherein the base and top frame are rectangular.

4. The collapsible cart of claim 1, wherein the base and top frame are square.

5. The collapsible cart of claim 1, wherein the cart can be locked in a folded position.

6. The collapsible cart of claim 1, wherein the storage receptacle comprises a basket.

7. The collapsible cart of claim 1, further comprising a handle attached to the base.

\* \* \* \* \*